(12) United States Patent
Kato

(10) Patent No.: US 11,538,276 B2
(45) Date of Patent: Dec. 27, 2022

(54) COMMUNICATION SYSTEM, DISTRIBUTED PROCESSING SYSTEM, DISTRIBUTED PROCESSING METHOD, AND RECORDING MEDIUM

(71) Applicant: Yoshinaga Kato, Tokyo (JP)

(72) Inventor: Yoshinaga Kato, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 124 days.

(21) Appl. No.: 16/628,406

(22) PCT Filed: Jul. 30, 2018

(86) PCT No.: PCT/JP2018/028411
§ 371 (c)(1),
(2) Date: Jan. 3, 2020

(87) PCT Pub. No.: WO2019/026828
PCT Pub. Date: Feb. 7, 2019

(65) Prior Publication Data
US 2020/0160036 A1    May 21, 2020

(30) Foreign Application Priority Data

Jul. 31, 2017  (JP) .............................. JP2017-148437
Jul. 19, 2018  (JP) .............................. JP2018-136067

(51) Int. Cl.
*G06T 7/11*        (2017.01)
*G06V 40/16*       (2022.01)
(Continued)

(52) U.S. Cl.
CPC .......... *G06V 40/168* (2022.01); *G06F 16/955* (2019.01); *G06T 7/11* (2017.01);
(Continued)

(58) Field of Classification Search
CPC ........... G06K 9/00362; G06K 9/00228; G06K 9/00268; G06F 16/955; G06T 7/11
See application file for complete search history.

(56) References Cited

U.S. PATENT DOCUMENTS

2007/0160264 A1 *  7/2007  Kasahara ............... G06V 40/10
                                                              340/5.52
2010/0067049 A1    3/2010  Kawada et al.
(Continued)

FOREIGN PATENT DOCUMENTS

CN    101330386 A    12/2008
CN    201204614 Y    3/2009
(Continued)

OTHER PUBLICATIONS

International Search Report dated Oct. 23, 2018 in PCT/JP2018/028411 filed on Jul. 30, 2018.
(Continued)

*Primary Examiner* — Sam Bhattacharya
(74) *Attorney, Agent, or Firm* — Harness, Dickey & Pierce, P.L.C.

(57) ABSTRACT

A communication system includes: an image acquisition terminal to obtain a captured image, the captured image including at least one object that is captured with an imaging unit; a distributed data processing terminal to display the captured image; and a centralized data processing server connected with the distributed data processing terminal through a network. The image acquisition terminal includes: an object detector to detect the object in the captured image to generate a partial image that is a part of the captured image having the detected object; and a first transmitter to transmit the partial image to the distributed data processing terminal as data to be verified. The distributed data processing terminal includes: a second transmitter to transmit the data to be verified that is received from the image acquisition
(Continued)

terminal, and verification data that is registered, respectively, to the centralized data processing server, the verification data being an image representing a specific object. The centralized data processing server includes: a verification unit to verify the data to be verified, using the verification data that is received from the distributed data processing terminal, to generate a verification result; and a third transmitter to transmit the verification result to the distributed data processing terminal, to cause the distributed data processing terminal to display information based on the verification result with the captured image.

20 Claims, 48 Drawing Sheets

(51) Int. Cl.
  G06F 16/955  (2019.01)
  H04L 65/60  (2022.01)
  H04L 67/10  (2022.01)
  G06V 40/10  (2022.01)
(52) U.S. Cl.
  CPC ............ *G06V 40/10* (2022.01); *G06V 40/161* (2022.01); *H04L 65/60* (2013.01); *H04L 67/10* (2013.01)

(56) References Cited

U.S. PATENT DOCUMENTS

| | | | |
|---|---|---|---|
| 2013/0117365 A1 | 5/2013 | Padmanabhan et al. | |
| 2013/0242034 A1 | 9/2013 | Kato et al. | |
| 2015/0007295 A1 | 1/2015 | Hou et al. | |
| 2017/0109852 A1 | 4/2017 | Ito | |
| 2017/0128748 A1* | 5/2017 | Matubara | A61B 5/1032 |

FOREIGN PATENT DOCUMENTS

| | | |
|---|---|---|
| CN | 102073849 A | 5/2011 |
| CN | 102646190 A | 8/2012 |
| CN | 103106736 A | 5/2013 |
| CN | 104052798 A | 9/2014 |
| CN | 104737533 A | 6/2015 |
| JP | 2007-272320 | 10/2007 |
| JP | 2012-195926 | 10/2012 |
| JP | 2016-519812 | 7/2016 |
| KR | 20150074410 A | 7/2015 |
| WO | WO2014/145877 A2 | 9/2014 |

OTHER PUBLICATIONS

Written Opinion of the International Seaching Authority dated Oct. 23, 2018 in PCT/JP2018/028411 filed on Jul. 30, 2018.
Chinese Office Action dated Feb. 24, 2022 corresponding to Chinese patent application No. CN201880049966.0.
Aslan, E. S. et al., *Distributed Face Recognition System For Indoor Environments*, IEEE, 2017.
Zhengbing, W., *Research of Fingerprint Identification System*. Guandong University of Technology, 2011. p. 1-67.

* cited by examiner

HEMISPHERICAL IMAGE (FRONT)

HEMISPHERICAL IMAGE (BACK)

CAPTURED IMAGE (EQUIRECTANGULAR PROJECTION IMAGE EC)

FIG. 9A

| PRODUCT NUMBER (TYPE) | NUMBER OF IMAGING ELEMENTS |
|---|---|
| AAA111 | 1 |
| AAA112 | 2 |
| ... | ... |

FIG. 9B

| VERIFICATION DATA FILE NAME | NAME |
|---|---|
| kato.jpg | Kato |
| asai.jpg | Asai |
| ... | ... |

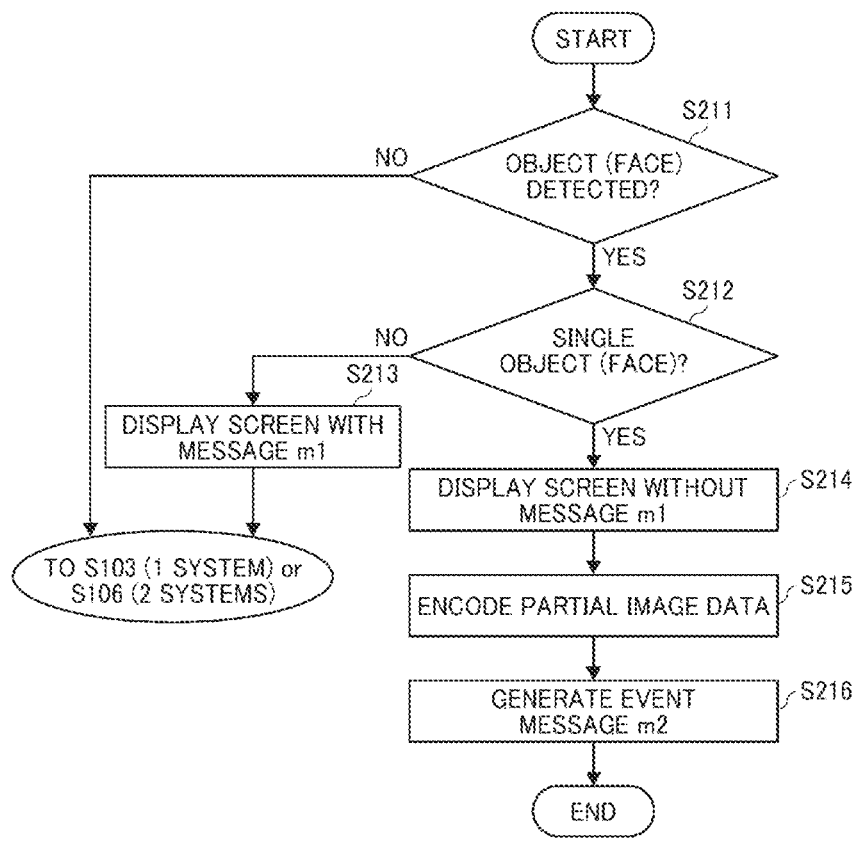

FIG. 25

| FEATURE VALUE | NAME |
|---|---|
| kato.ft | Kato |
| asai.ft | Asai |
| ... | ... |

FIG. 28 COMMUNICATION SYSTEM 1A

FIG. 33A

| TERMINAL ID/DEVICE ID | TERMINAL NAME | IP ADDRESS |
|---|---|---|
| 01aa | Japan Tokyo Office AA Terminal | 1.2.1.3 |
| 01ab | Japan Tokyo Office Mr. AB | 1.2.1.4 |
| ... | ... | ... |
| 111a | Tokyo Region | 1.2.1.2 |
| 111a | Osaka Region | 1.2.2.2 |
| ... | ... | ... |

FIG. 33B

| SESSION ID | RELAY DEVICE ID | TERMINAL ID OF STARTING TERMINAL | TERMINAL ID OF COUNTERPART TERMINAL |
|---|---|---|---|
| se01 | 111a | 01aa | 01ba, 01ca |
| se02 | 111a | 01bb | 01bc |
| ... | ... | ... | ... |

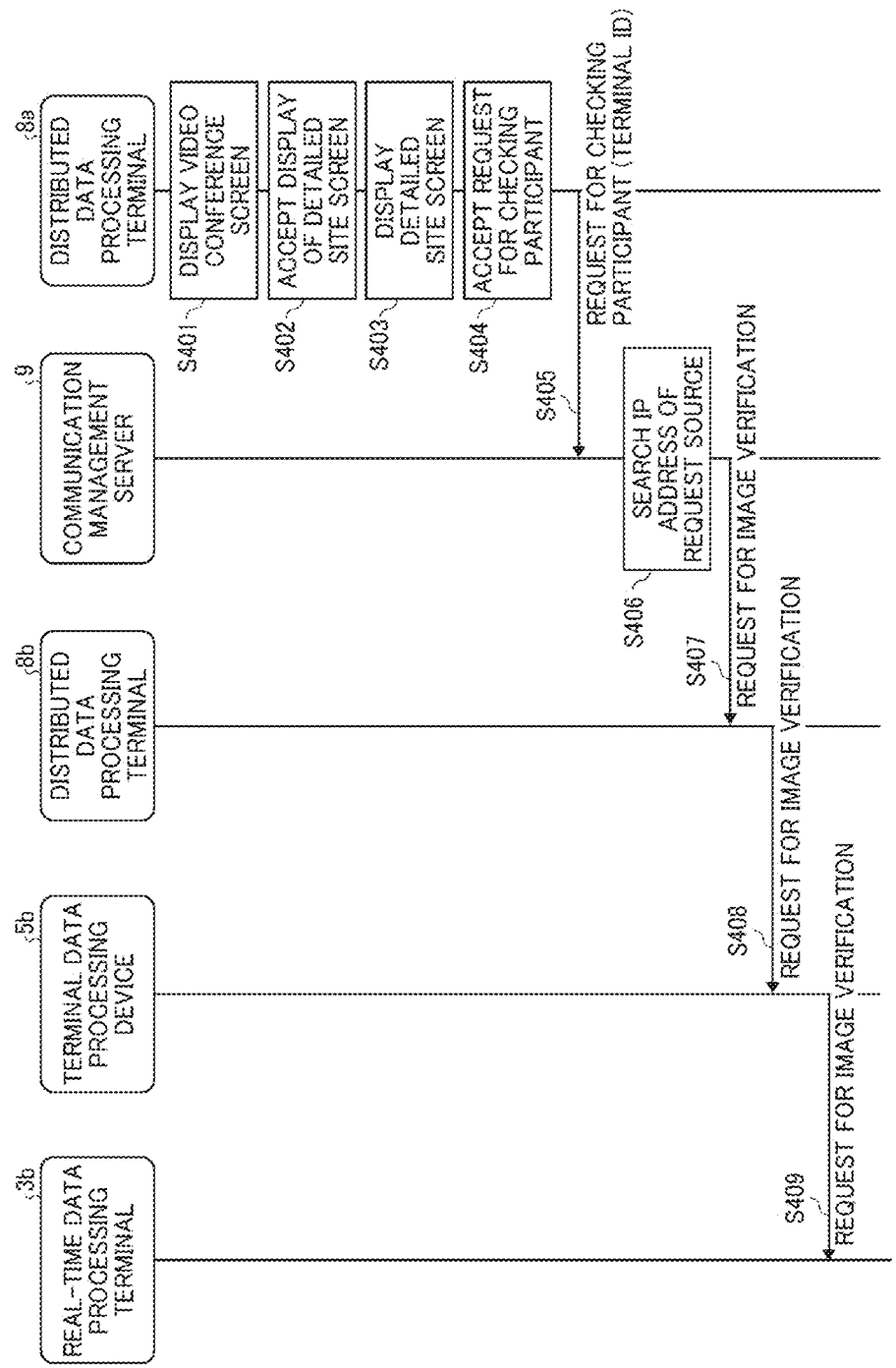

COMMUNICATION SYSTEM, DISTRIBUTED PROCESSING SYSTEM, DISTRIBUTED PROCESSING METHOD, AND RECORDING MEDIUM

CROSS-REFERENCE TO RELATED APPLICATIONS

This application is a national phase under 35 U.S.C. § 371 of PCT International Application No. PCT/JP2018/028411 which has an International filing date of Jul. 30, 2018, which claims priority to Japanese Patent Application Nos. 2017-148437, filed Jul. 31, 2017, and 2018-136067 filed Jul. 19, 2018, the entire contents of each of which are hereby incorporated by reference.

TECHNICAL FIELD

The present invention relates to a communication system, a distributed processing system, a distributed processing method, and a recording medium.

BACKGROUND ART

Recently, Internet of Things (IoT) attracts attention. For example, a large-scale communication system is available using cloud computing technique. In such communication system, an image acquisition terminal acquires image data, and transmits the image data to a server via the Internet to request for processing to analyze the image data. For example, PTL 1 discloses a cloud service platform for performing processing to recognize a human face at a server. Specifically, a camera is provided at the image acquisition terminal (edge ​​node). The image acquisition terminal transmits image data captured at the camera to the centralized server (a face recognition application server), to request for performing processing to recognize a human face in the captured image.

CITATION LIST

Patent Literature

PTL 1: Japanese Translation of PCT International Application Publication No. JP-T-2016-519812

SUMMARY OF INVENTION

Technical Problem

The system described in PTL 1 may, however, suffer from a response delay due to the increase in loads on the network. For example, if the image acquisition terminal continuously transmits image data to the server, a large amount of data will flow over the Internet in a short time, leading to the increase in loads on the network. Further, the verification process to be executed at the server requires extraction of feature values from the image data being received. This may increase in loads on the server, resulting in delay in transmitting a verification result to the image acquisition terminal.

Solution to Problem

In view of the above, example embodiments of the present invention include a communication system including: an image acquisition terminal to obtain a captured image, the captured image including at least one object that is captured with an imaging unit; a distributed data processing terminal to display the captured image; and a centralized data processing server connected with the distributed data processing terminal through a network. The image acquisition terminal includes: an object detector to detect the object in the captured image to generate a partial image that is a part of the captured image having the detected object; and a first transmitter to transmit the partial image to the distributed data processing terminal as data to be verified. The distributed data processing terminal includes: a second transmitter to transmit the data to be verified that is received from the image acquisition terminal, and verification data that is registered, respectively, to the centralized data processing server, the verification data being an image representing a specific object. The centralized data processing server includes: a verification unit to verify the data to be verified, using the verification data that is received from the distributed data processing terminal, to generate a verification result; and a third transmitter to transmit the verification result to the distributed data processing terminal, to cause the distributed data processing terminal to display information based on the verification result with the captured image.

Example embodiments of the present invention include a distributed processing system that includes the above-described image acquisition terminal and the distributed data processing terminal.

Example embodiments of the present invention include a distributed processing method performed by the distributed processing system, and a control program that causes one or more processors to perform the distributed processing method.

Advantageous Effects of Invention

As described in this disclosure, according to one or more embodiments of the present invention, an apparatus, system, method, and a program stored in a recording medium are provided, which can suppress the increase in loads on the network, thus sup-pressing a delay in transmission of a verification result from the server.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

FIG. 9A is a conceptual diagram illustrating an example of an element number management table, and FIG. 9B is a conceptual diagram illustrating an example of a verification data management table, according to the embodiment.

FIG. 13 is a flowchart illustrating an example of event generation processing, performed in the real-time processing, according to the first example of the embodiment.

FIG. 25 is a conceptual diagram illustrating an example of feature value management table.

FIG. 33A is a conceptual diagram illustrating an example of terminal and device management table, according to the embodiment. FIG. 33B is a conceptual diagram illustrating an example of session management table, according to the embodiment.

FIG. 34 is a sequence diagram illustrating operation of processing an image recognition start request, performed by the communication system of FIG. 28, according to another embodiment.

DESCRIPTION OF EMBODIMENTS

Overview

Figure 1:
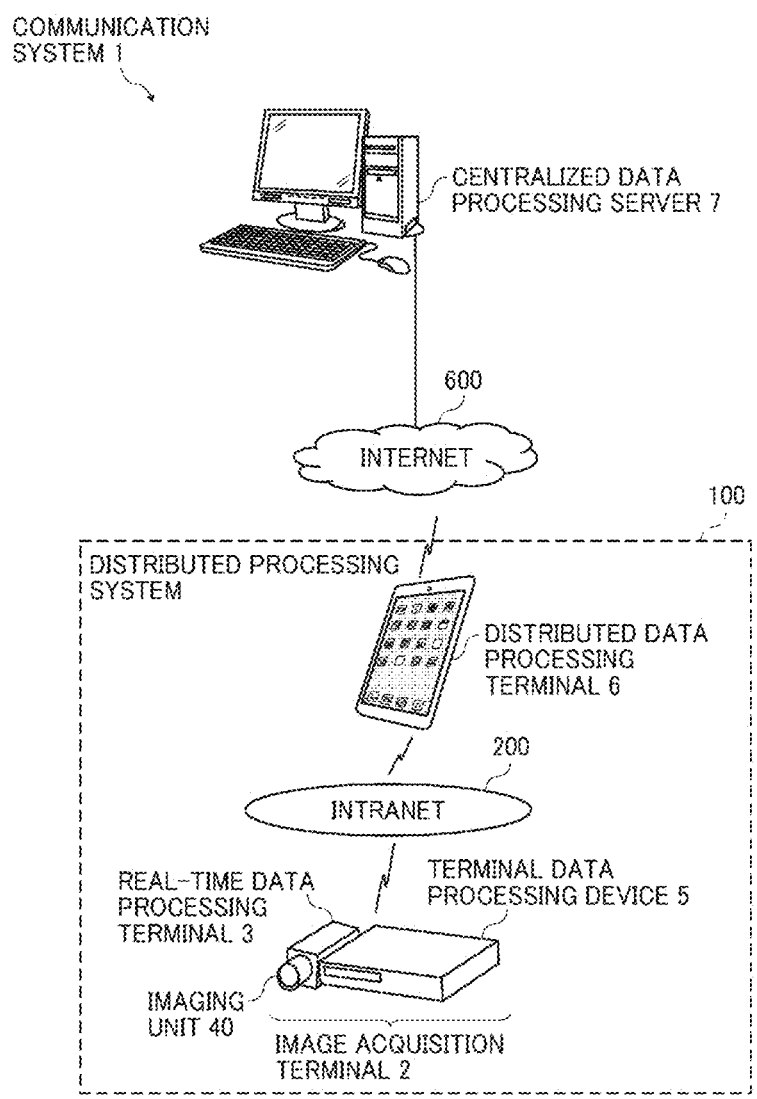
FIG. 1 is a schematic diagram illustrating a communication system according to an embodiment.

Referring to the drawings, one or more embodiments of the present invention are described.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

<<System Configuration>>

FIG. 1 is a schematic diagram illustrating a configuration of a communication system 1 according to an embodiment. As illustrated in FIG. 1, the communication system 1 of this embodiment includes a real-time data processing terminal 3, a terminal data processing device 5, a distributed data processing terminal 6, and a centralized data processing server 7. The real-time data processing terminal 3, the terminal data processing device 5, and the distributed data processing terminal 6 together operate as a distributed processing system 100.

The real-time data processing terminal 3 is a terminal that captures images in real-time to obtain real-time captured image data. This processing to capture images in real-time may be referred to as real-time processing. The real-time data processing terminal 3 is detachably connected to an imaging unit 40 provided with an image sensor that captures an image of a target, such as a Complementary Metal Oxide Semiconductor (CMOS) sensor or a Charge Coupled Device (CCD) sensor. The real-time data processing terminal 3 digitizes the captured image, which is input from the imaging unit 40, into captured image data, and detects a specific object (here, an image of a human face) in the captured image in real-time (for example, every 1/60 seconds). The real-time data processing terminal 3 transmits, to the terminal data processing device 5, data of a partial image of the captured image having the detected object ("partial image data").

The terminal data processing device 5, which is located closely to the real-time data processing terminal 3, is connected to the real-time data processing terminal 3 in a one-to-one correspondence, for example, by a data bus, a Universal Serial Bus (USB), or the like. The terminal data processing device 5 encodes the partial image data received from the real-time data processing terminal 3 into encoded partial image data in a general-purpose format such as Joint Photographic Experts Group (JPEG). The terminal data processing device 5 further transmits the encoded partial image data to the distributed data processing terminal 6 via the intranet 200, as data to be verified in processing of facial image verification. The real-time data processing terminal 3 and the terminal data processing device 5 are connected with each other so as to together function as an image acquisition terminal 2.

The distributed data processing terminal 6 is a computer that accepts various operations from a user, and is disposed at a location relatively close to the terminal data processing device 5, compared to a location of the centralized data processing server 7 with respect to the distributed data processing terminal 6. The distributed data processing terminal 6 previously registers verification data for facial image verification. The distributed data processing terminal 6 transmits a request, via the Internet 600, for requesting the centralized data processing server 7 to verify the data to be verified, using the verification data. In such case, the distributed data processing terminal 6 also transmits, to the centralized data processing server 7, the data to be verified that is received from the terminal data processing device 5 and the pre-registered verification data. In response, the distributed data processing terminal 6 receives, from the centralized data processing server 7, verification result information indicating the verification result. Further, the distributed data processing terminal 6 displays the received verification result via a graphical interface.

The centralized data processing server 7 is disposed at a location relatively far from the terminal data processing device 5. The centralized data processing server 7 communicates with the distributed data processing terminal 6 via a communication network such as the Internet 600. In response to reception of the verification request, the verification data, and the data to be verified, the centralized data processing server 7 compares between the verification data and the data to be verified to determine the degree of similarity. The centralized data processing server 7 transmits verification result information indicating the verification result that includes the determined similarity to the distributed data processing terminal 6.

<<Hardware Configuration>>

Referring now to FIGS. 2 to 6, a hardware configuration of the communication system 1 is described according to the embodiment.

<Hardware Configuration of Real-Time Data Processing Terminal>

Figure 2:
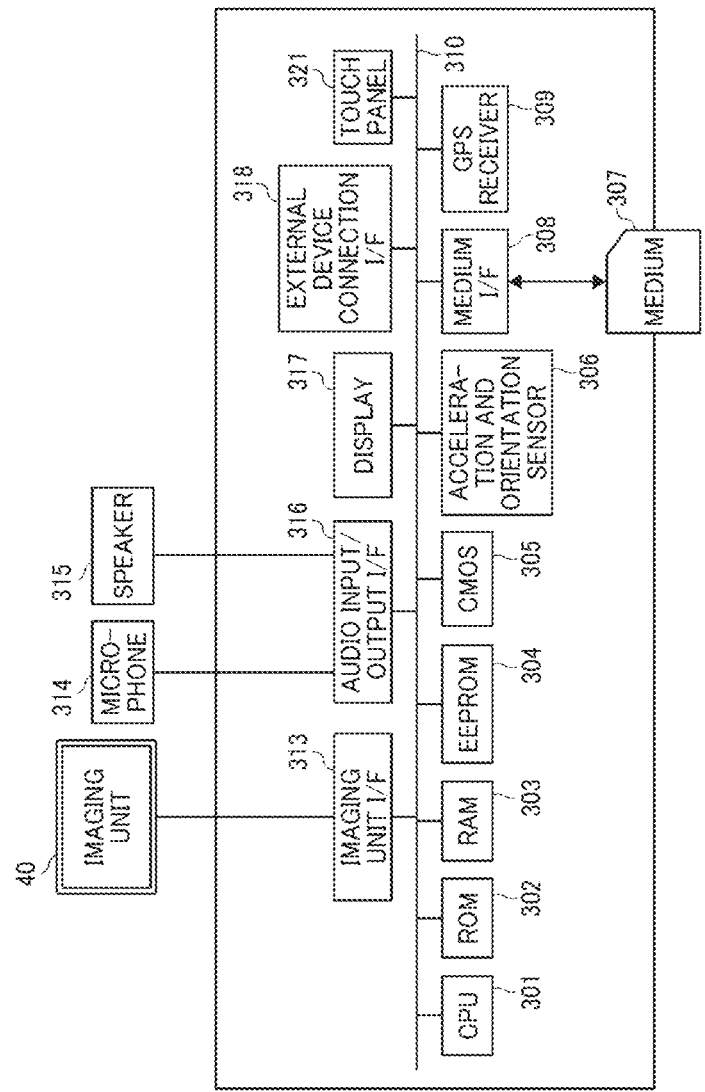
FIG. 2 is a schematic diagram illustrating a hardware configuration of a real-time data processing terminal, according to the embodiment.

FIG. 2 is a schematic diagram illustrating a hardware configuration of the real-time data processing terminal 3, according to the embodiment. The real-time data processing terminal 3 includes a CPU 301, a ROM 302, a RAM 303, an EEPROM 304, a CMOS sensor (CMOS) 305, an acceleration and orientation sensor 306, a medium I/F 308, and a GPS receiver 309.

The CPU 301 controls entire operation of the real-time data processing terminal 3. The ROM 302 stores a control program for operating the CPU 301. The RAM 303 is used as a work area for the CPU 301. The EEPROM 304 reads or writes various data such as a control program for the real-time data processing terminal under control of the CPU 301. Under control of the CPU 301, the CMOS sensor 305 captures an image of a target (mainly a blind spot of the imaging unit 40) to obtain image data. The acceleration and orientation sensor 306 includes various sensors such as an electromagnetic compass for detecting geomagnetism, a gyrocompass, and an acceleration sensor. The medium I/F 308 controls reading or writing of data with respect to a recording medium 307 such as a flash memory. The GPS receiver 309 receives a GPS signal from a GPS satellite.

The real-time data processing terminal 3 further includes an imaging unit I/F 313, a microphone 314, a speaker 315, an audio input/output I/F 316, a display 317, an external device connection I/F 318, and a touch panel 321.

The imaging unit I/F 313 is a circuit that controls driving of the imaging unit 40 when an external imaging unit 40 is connected to the real-time data processing terminal 3. The microphone 314 is an example of built-in audio collecting device capable of inputting audio under control of the CPU 301. The audio I/O I/F 316 is a circuit for inputting or outputting an audio signal between the microphone 314 and the speaker 315 under control of the CPU 301. The display 317 may be a liquid crystal or organic electro luminescence (EL) display that displays an image of a target, an operation icon, or the like. The external device connection I/F 318 is an interface circuit that connects the real-time data processing terminal 3 to various external devices. The touch panel 321 is an example of input device that enables the user to input a user instruction to the real-time data processing terminal 3 through touching a screen of the display 317.

The real-time data processing terminal 3 further includes a bus line 310. The bus line 310 is an address bus or a data bus, which electrically connects the elements in FIG. 2 such as the CPU 301.

<Hardware Configuration of Imaging Unit>

Figure 3A:
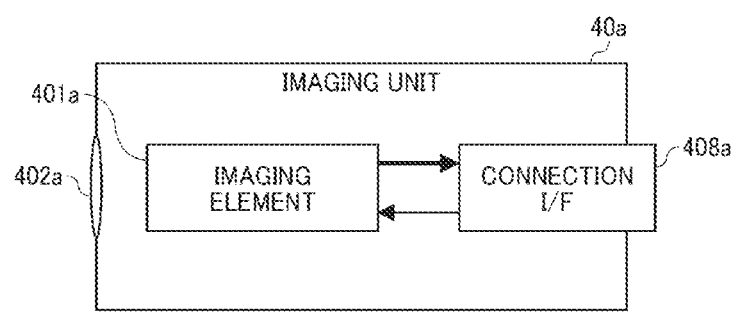
FIGS. 3A and 3B (FIG. 3) are schematic diagrams each illustrating a hardware configuration of an imaging unit, according to the embodiment.
Figure 3B:
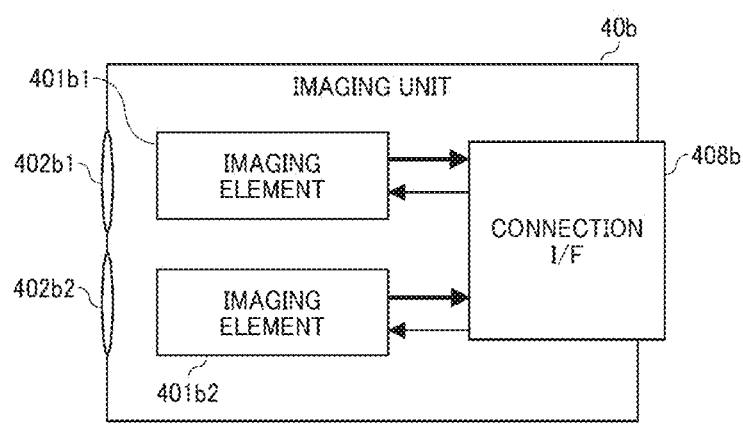

FIGS. 3A and 3B are each a schematic block diagram illustrating a hardware configuration of the imaging unit 40, according to the embodiment. Specifically, FIG. 3A illustrates a hardware configuration of a monocular imaging unit 40a, as an example of the imaging unit 40. FIG. 3B illustrates a hardware configuration of a compound eye imaging unit 40b, as an example of the imaging unit 40. The imaging unit 40 is a generic term for a plurality of types of imaging units (imaging unit 40a, 40b, etc.) having different number of imaging elements.

As illustrated in FIG. 3A, the imaging unit 40a includes an imaging element 401a such as a CMOS or a CCD, a lens 402a, and a connection I/F 408a to be electronically connected to the imaging unit I/F 313 of the real-time data processing terminal 3. When the imaging unit 40a is connected to the imaging unit I/F 313 of the real-time data processing terminal 3, the imaging element 401a captures an image according to an imaging control signal transmitted from the imaging unit I/F 313 via the connection I/F 408a. Accordingly, the imaging unit 40a illustrated in FIG. 3A obtains a planar image.

As illustrated in FIG. 3B, the imaging unit 40b includes imaging elements 401b1 and 401b2 each may be a CMOS or a CCD, lenses 402b1 and 402b2, and a connection I/F 408b to be electronically connected to the imaging unit I/F 313 of the real-time data processing terminal 3. The lenses 402b1 and 402b2 are, for example, fisheye lenses. When the imaging unit 40b is connected to the imaging unit I/F 313 of the real-time data processing terminal 3, each of the imaging element 401b1 and 401b2 captures an image according to an imaging control signal transmitted from the imaging unit I/F 313 via the connection I/F 408b, and transmits the captured image to the imaging unit I/F 313. Accordingly, a plurality of images is transmitted as captured image data. Accordingly, the imaging unit 40b illustrated in FIG. 3B obtains a spherical image, which may be referred to as an equirectangular projection image as described below.

Figure 4A:
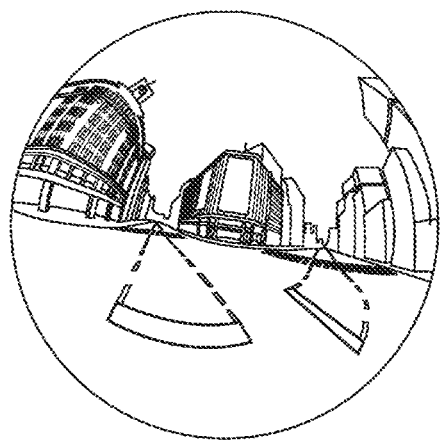
FIGS. 4A and 4B are views illustrating a hemispherical image (front side) and a hemispherical image (back side), respectively captured by the imaging unit of FIG. 3B.
Figure 4B:
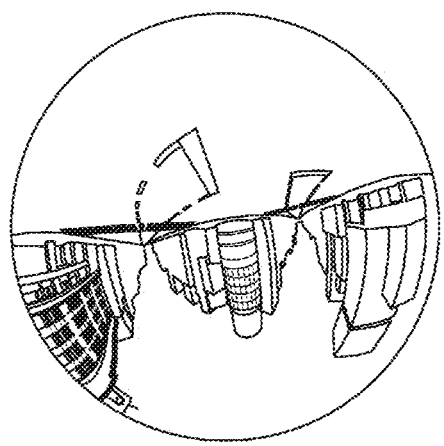
Figure 4C:
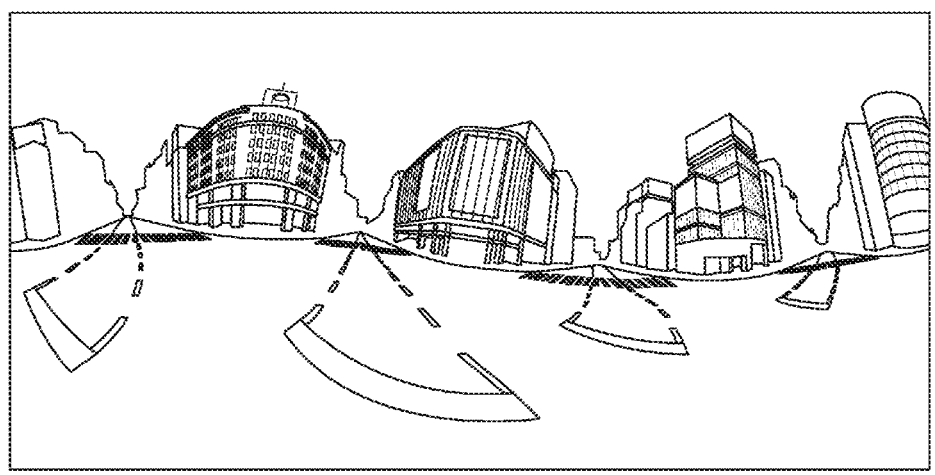
FIG. 4C is a view illustrating an image in equirectangular projection generated from the images illustrated in FIGS. 4A and 4B.

Next, referring to FIGS. 4A to 4C, a description is given of an overview of operation of generating an equirectangular projection image EC from the images captured by the imaging unit 40b. FIG. 4A is a view illustrating a hemispherical image (front side) captured by the imaging unit 40b. FIG. 4B is a view illustrating a hemispherical image (back side) captured by the imaging unit 40b. FIG. 4C is a view illustrating an image in equirectangular projection, which is referred to as an "equirectangular projection image" (or equidistant cylindrical projection image) EC.

As illustrated in FIG. 4A, an image captured by the imaging element 401b1 is a curved hemispherical image (front side) taken through the lens 402b1. Similarly, as illustrated in FIG. 4B, an image captured by the imaging element 401b2 is a curved hemispherical image (back side) taken through the lens 402b2. The hemispherical image (front side) and the hemispherical image (back side), which are reversed by 180-degree from each other, are combined by the real-time data processing terminal 3. This results in generation of the equirectangular projection image EC as illustrated in FIG. 4C.

<Hardware Configuration of Terminal Data Processing Device and Distributed Data Processing Terminal>

Figure 5:
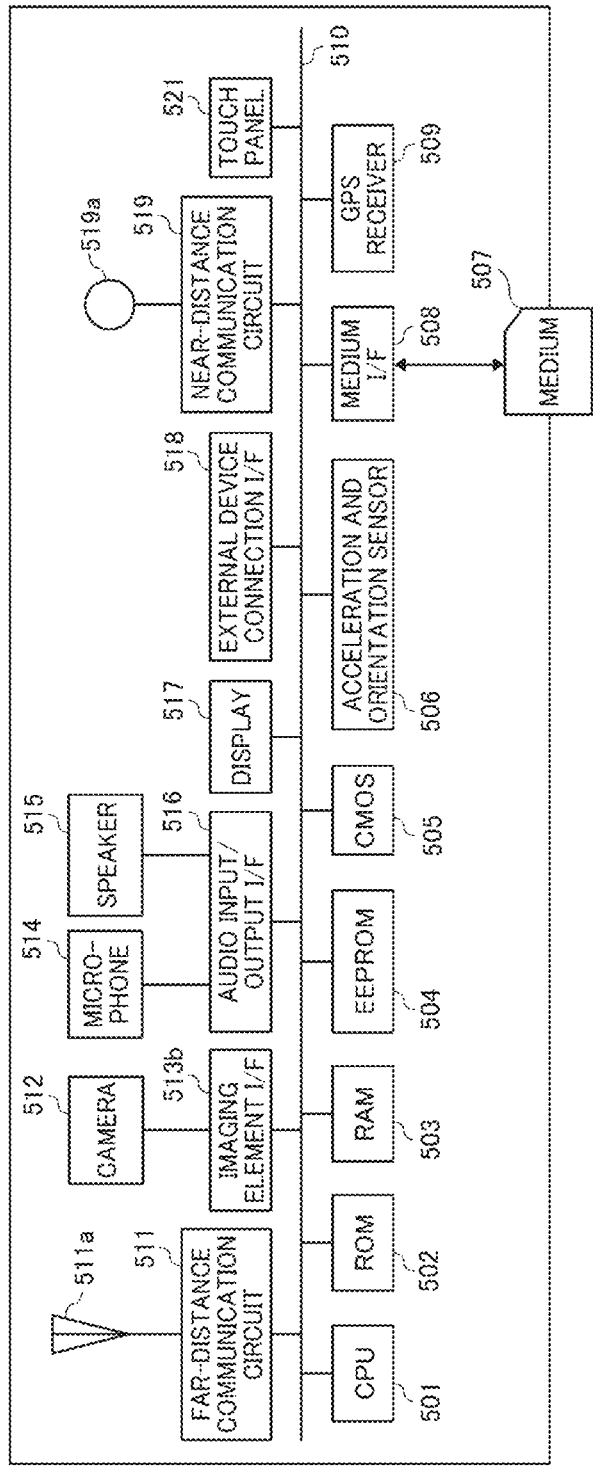
FIG. 5 is a schematic diagram illustrating a hardware configuration of each one of a terminal data processing device and a distributed data processing terminal, according to the embodiment.

FIG. 5 is a schematic diagram illustrating a hardware configuration of each one of the terminal data processing device 5 and the distributed data processing terminal 6, according to the embodiment. Since the terminal data processing device 5 and the distributed data processing terminal 6 are substantially the same in hardware configuration, an example case of the terminal data processing device 5 is described below, while omitting the description of the distributed data processing terminal 6.

As illustrated in FIG. 5, the terminal data processing device 5 includes a CPU 501, a ROM 502, a RAM 503, an EEPROM 504, a CMOS sensor 505, an acceleration and orientation sensor 506, a medium I/F 508, and a GPS receiver 509.

The CPU 501 controls entire operation of the terminal data processing device 5. The ROM 502 stores a control program for controlling the CPU 501. The RAM 503 is used as a work area for the CPU 501. The EEPROM 504 reads or writes various data such as a control program for the terminal data processing device under control of the CPU 501. The CMOS sensor 505 captures an object (for example, a self-image of the user operating the terminal data processing device 5) under control of the CPU 501 to obtain captured image data. The acceleration and orientation sensor 506 includes various sensors such as an electromagnetic compass for detecting geomagnetism, a gyrocompass, and an acceleration sensor. The medium I/F 508 controls reading or writing of data with respect to a recording medium 507 such as a flash memory. The GPS receiver 509 receives a GPS signal from a GPS satellite.

The terminal data processing device 5 further includes a far-distance communication circuit 511, an antenna 511a for the far-distance communication circuit 511, a camera 512, an imaging element I/F 513, a microphone 514, a speaker 515, an audio input/output I/F 516, a display 517, an external device connection I/F 518, a near-distance communication circuit 519, an antenna 519a for the near-distance communication circuit 519, and a touch panel 521.

The far-distance communication circuit 511 is a circuit that communicates with another device through the intranet 200. The camera 512 is an example of built-in imaging device capable of capturing a target under control of the CPU 501. The imaging element 1/F 513 is a circuit that controls driving of the camera 512. The microphone 514 is an example of built-in audio collecting device capable of inputting audio under control of the CPU 501. The audio I/O I/F 516 is a circuit for inputting or outputting an audio signal between the microphone 514 and the speaker 515 under control of the CPU 501. The display 517 may be a liquid crystal or organic electro luminescence (EL) display that displays an image of a subject, an operation icon, or the like. The external device connection I/F 518 is an interface circuit that connects the terminal data processing device 5 to various external devices. The near-distance communication circuit 519 is a communication circuit that communicates in compliance with the near field radio communication (NFC) (Registered Trademark), the Bluetooth (Registered Trademark), and the like. The touch panel 521 is an example of input device that enables the user to input a user instruction for operating the terminal data processing device 5 through touching a screen of the display 517.

The terminal data processing device 5 further includes a bus line 510. The bus line 510 may be an address bus or a data bus, which electrically connects various elements such as the CPU 501 of FIG. 5.

<Hardware Configuration of Centralized Data Processing Server>

Figure 6:
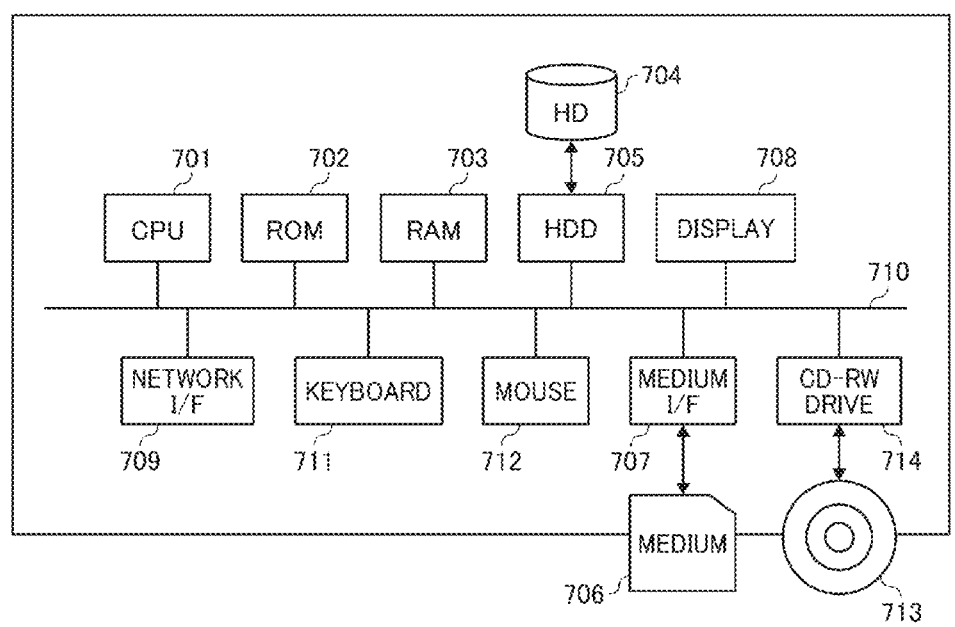
FIG. 6 is a schematic diagram illustrating a hardware configuration of a centralized data processing server, according to the embodiment.

FIG. 6 is a schematic diagram illustrating a hardware configuration of the centralized data processing server 7, according to the embodiment. Referring to FIG. 6, the centralized data processing server 7, which is implemented by the general-purpose computer, includes a CPU 701, a ROM 702, a RAM 703, a hard disk (HD) 704, a hard disk drive (HDD) 705, a medium I/F 707, a display 708, a network I/F 709, a keyboard 711, a mouse 712, a CD-RW drive 714, and a bus line 710. Since the centralized data processing server 7 operates as a server, an input device such as the keyboard 711 and the mouse 712, or an output device such as the display 708 does not have to be provided.

The CPU 701 controls entire operation of the centralized data processing server 7. The ROM 702 stores a control program for controlling the CPU 701. The RAM 703 is used as a work area for the CPU 701. The HD 704 stores various data such as programs. The HDD 705 controls reading or writing of various data to or from the HD 704 under control of the CPU 701. The medium I/F 707 controls reading or writing of data with respect to a recording medium 706 such as a flash memory. The display 708 displays various information such as a cursor, menu, window, characters, or image. The network I/F 709 is an interface that controls communication of data with an external device through the Internet 600. The keyboard 711 is one example of input device provided with a plurality of keys for allowing a user to input characters, numerals, or various instructions. The mouse 712 is one example of input device for allowing the user to select a specific instruction or execution, select a target for processing, or move a curser being displayed. The CD-RW drive 714 reads or writes various data with respect to a Compact Disc ReWritable (CD-RW) 713, which is one example of removable recording medium.

The centralized data processing server 7 further includes a bus line 710. The bus line 710 is an address bus or a data bus, which electrically connects the elements in FIG. 6 such as the CPU 701.

<<Software Configuration>>

Figure 7:
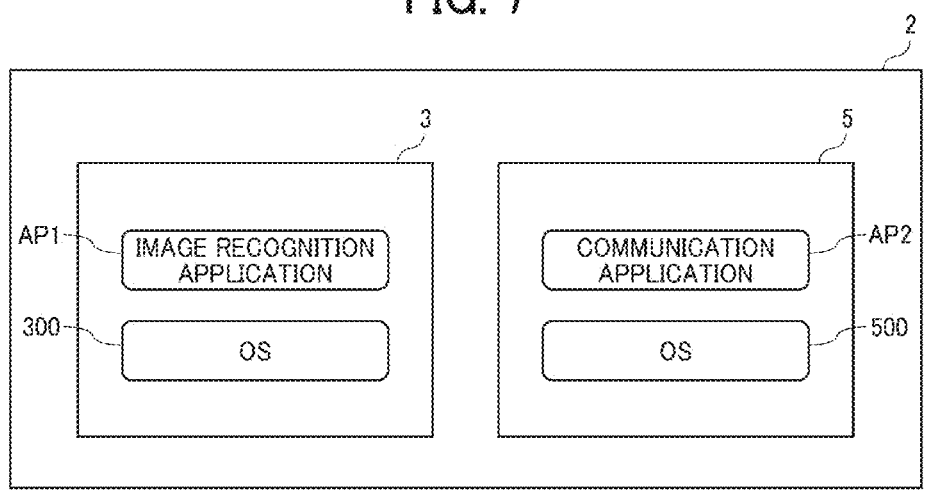
FIG. 7 is a schematic diagram illustrating a software configuration of the real-time data processing terminal and the terminal data processing device, according to the embodiment.

FIG. 7 is a schematic diagram illustrating a software configuration of the real-time data processing terminal 3 and the terminal data processing device 5, which together operate as the image acquisition terminal 2, according to the embodiment.

As illustrated in FIG. 7, the real-time data processing terminal 3 includes OS 300, and image recognition application AP1. The image recognition application AP1 is deployed in a work area, such as the RAM 303 of the real-time data processing terminal 3. The OS 300 is basic software that controls entire operation of the real-time data processing terminal 3 through providing basic functions. The image recognition application AP1 is an application for recognizing faces of people, animals, etc. from the captured images.

The terminal data processing device 5 includes OS 500 and communication application AP2. The communication application AP2 is deployed in a work area, such as the RAM 503 of the terminal data processing device 5. The OS 500 is basic software that controls entire operation of the terminal data processing device 5 through providing basic functions. The communication application AP2 is an application for communicating with another terminal (device) such as the distributed data processing terminal 6.

In the image acquisition terminal 2, while the real-time data processing terminal 3 performs image recognition, the terminal data processing device 5 communicates with the distributed data processing terminal 6 via the intranet 200 to perform distributed processing to transmit the partial image data as data to be verified, or receive a verification result.

The OS 300 and the OS 500 may be the operating system of the same version, or the same type (that is, with a different version). Alternatively, the OS 300 and the OS 500 may be the operating systems that are different, or the operating systems of different versions.

Alternatively, the OS 300 and the OS 500 may be implemented by one OS, on which the image recognition application AP1 and the communication application AP2 execute on the same OS.

In case the OS 300 and the OS 500 are implemented by one OS, in one example, the real-time data processing terminal 3 and the terminal data processing device 5 may be configured as one device, which is referred to as the image acquisition terminal 2, by sharing the same hardware.

In another example, one of the real-time data processing terminal 3 and the terminal data processing device 5 is provided with OS to be shared between the real-time data processing terminal 3 and the terminal data processing device 5. For example, if the terminal data processing device 5 is provided with OS, the OS is shared with the real-time data processing terminal 3 that is not provided with OS, for example, by communication between the terminal data processing device 5 and the real-time data processing terminal 3.

Even when the real-time data processing terminal 3 and the terminal data processing device 5 are configured as one device, or operate under one OS, the real-time data processing and transmission of data are performed using different applications, that is, the image recognition application AP1 and the communication application AP2, as described above. Accordingly, the real-time data processing and data transmission may be performed concurrently, thus improving overall efficiency in processing.

Further, even in the case where the real-time data processing terminal 3 and the terminal data processing device 5 are configured as one device, two operating systems may be provided on which two applications, i.e., the image recognition application AP1 and the communication application AP2, are executed. In other words, there are many various types of configuration of the image acquisition terminal 2. Note that the real-time data processing terminal 3 and the terminal data processing device 5 are each installed with not only the OS but also a driver, a software development kit (SDK), or an application programming interface (API) that may be different between the real-time data processing terminal 3 and the terminal data processing device 5.

First Example

Referring to FIGS. 8 to 17, a functional configuration of the communication system 1, and operations to be performed by the communication system 1, are described according to a first example of the embodiment.

<<Functional Configuration>>

Figure 8:
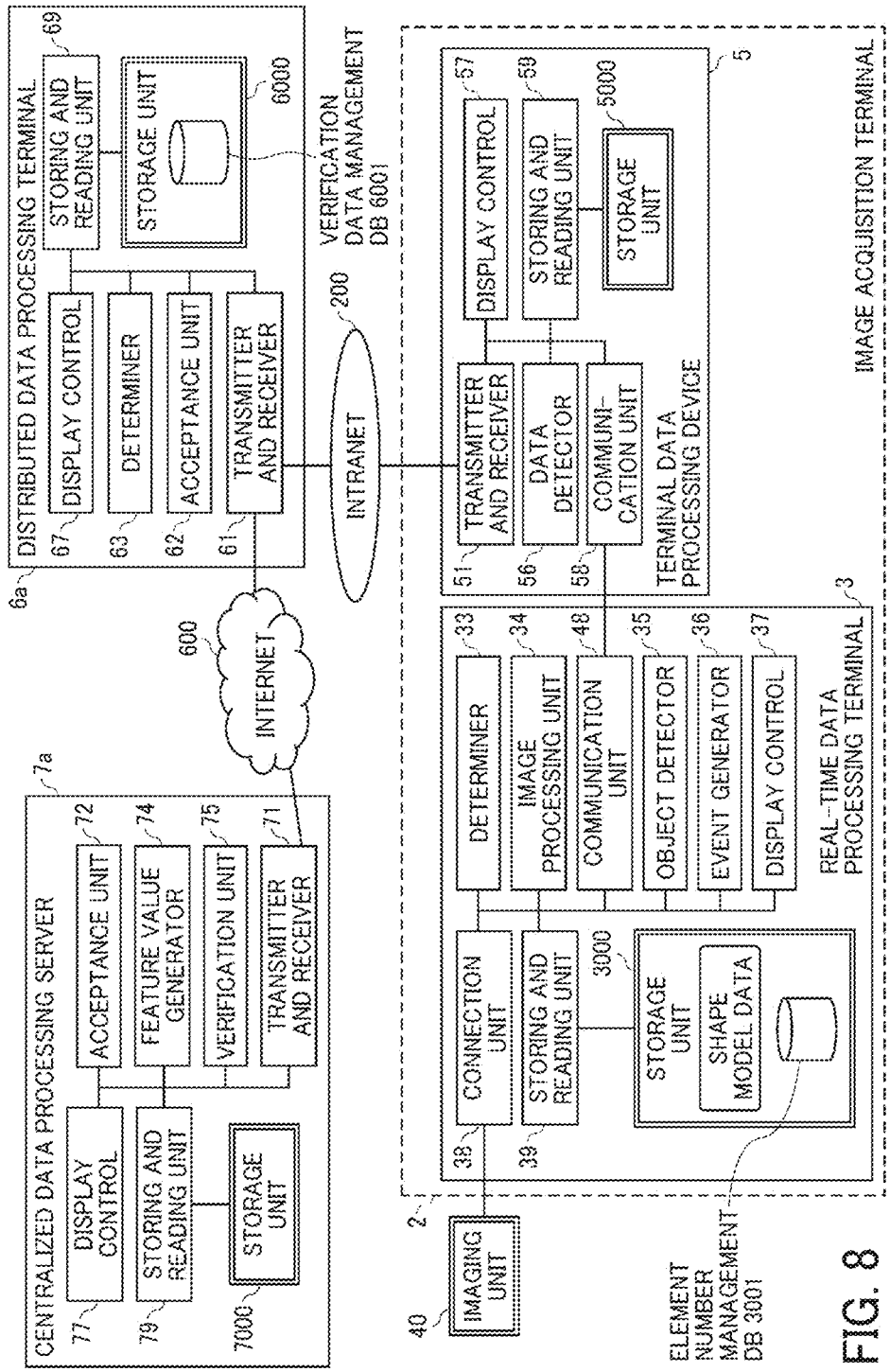
FIG. 8 is a schematic block diagram illustrating a functional configuration of the communication system of FIG. 1, according to first to fourth examples of the embodiment.

First, referring to FIG. 8 and FIG. 9, functional configurations of terminals, apparatuses, and servers in the communication system 1 are described, according to the embodiment. FIG. 8 is a schematic block diagram illustrating a functional configuration of the communication system 1 according to the first example, and second examples to fourth examples described below. In FIG. 8, a distributed data processing terminal 6a is illustrated as an example of the distributed data processing terminal 6 in FIG. 1. Further, in FIG. 8, a centralized data processing server 7a is illustrated as an example of the centralized data processing server 7 in FIG. 1.

<Functional Configuration of Real-Time Data Processing Terminal>

Referring to FIG. 8, the real-time data processing terminal 3 includes a determiner 33, an image processing unit 34, an object detector 35, an event generator 36, a display control 37, a connection unit 38, a storing and reading unit 39, and a communication unit 48. These units are functions that are implemented by or that are caused to function by operating any of the hardware components illustrated in FIG. 2 in cooperation with the instructions of the CPU 301 according to the control program expanded from the EEPROM 304 to the RAM 303.

The real-time data processing terminal 3 further includes a storage unit 3000, which is implemented by the ROM 302, the RAM 303, and/or the EEPROM 304 illustrated in FIG. 2. The storage unit 3000 stores therein shape model data. The storage unit 3000 further includes an imaging element number management DB 3001. The imaging element number management DB 3001 is implemented by an imaging element number management table, which is described below.

(Imaging Element Number Management Table)

FIG. 9A is a conceptual diagram illustrating an imaging element number management table according to the embodiment. The imaging element number management table stores, for each one or more imaging units 40, a product number (such as a serial number) of the imaging unit 40 and the number of imaging elements included in the imaging unit 40 in association with each other. The product number is an example of type information indicating a type of the imaging unit 40 that is determined by the difference in number of imaging elements.

(Functional Configuration of Real-Time Data Processing Terminal)

Referring to FIG. 8, a functional configuration of the real-time data processing terminal 3 is described according to the embodiment.

The determiner 33, which is implemented by instructions of the CPU 301, performs various determinations. For example, the determiner 33 refers to the imaging element number management DB 3001 to determine a number of imaging elements of the imaging unit 40 having the product number sent from the imaging unit 40.

The image processing unit 34, which is implemented by the instructions of the CPU 301, obtains a captured image sent from the image capturing unit 40 as real-time digital image data (for example, at intervals of /60 seconds). The image processing unit 34 performs image processing according to the determination by the determiner 33.

The object detector 35, which is implemented by the instructions of the CPU 301, detects feature points, as candidates of a specific object such as a human face, in the captured image data acquired by the image processing unit 34. Specifically, the object detector 35 refers to the shape model data indicating a shape model of the specific object (such as the human face) to detect the coordinates of the specific object in the captured image.

The event generator 36, which ​​ is implemented by the instructions of the CPU 301, generates detection data (event data) indicating detection of a specific object, such that the coordinates of a specific object are specified by the object detector 35.

The display control 37, which is implemented by the instructions of the CPU 301, controls the display 317 to display various screens.

The connection unit 38, which is implemented by the imaging unit I/F 313 and the instructions of the CPU 301, is an interface for mechanically and electrically connecting the imaging unit 40 to the real-time data processing terminal 3.

The storing and reading unit 39, which is implemented by instructions of the CPU 301, stores various data or information in the storage unit 3000 or reads out various data or information from the storage unit 3000.

The communication unit 48, which may be implemented by the instructions of the CPU 301 and the external device connection I/F 318, transmits or receives various data (or information) to or from the communication unit 58 of the terminal data processing device 5. The one-to-one communication between the communication unit 48 and the communication unit 58 may be performed via a wired network or a wireless network.

<Functional Configuration of Terminal Data Processing Device>

As illustrated in FIG. 8, the terminal data processing device 5 includes a transmitter and receiver 51, a data detector 56, a display control 57, a communication unit 58, and a storing and reading unit 59. These units are functions that are implemented by or that are caused to function by operating any of the elements illustrated in FIG. 5 in cooperation with the instructions of the CPU 501 according to the control program expanded from the EEPROM 504 to the RAM 503.

The terminal data processing device 5 further includes a storage unit 5000, which is implemented by the ROM 502, RAM 503 and EEPROM 504 illustrated in FIG. 5.

(Functional Configuration of Terminal Data Processing Device)

Referring to FIG. 8, a functional configuration of the terminal data processing device 5 is described according to the first example.

The transmitter and receiver 51 of the terminal data processing device 5, which is implemented by the far-distance communication circuit 511, the antenna 511a, and the instructions of the CPU 501, transmits or receives various data (or information) to or from the distributed data processing terminal 6a via a communication network (the intranet 200).

The data detector 56, which is implemented by the instructions of the CPU 501, detects whether or not an event has occurred that triggers reception of data from the real-time data processing terminal 3, and whether or not the reception of data is completed.

The display control 57, which is implemented by the instructions of the CPU 501, controls the display 517 to display various screens.

The communication unit 58, which may be implemented by the instructions of the CPU 501 and the external device connection I/F 518, transmits or receives various data (or information) to or from the communication unit 48 of the real-time data processing terminal 3. The one-to-one communication between the communication unit 58 and the communication unit 48 may be performed via a wired network or a wireless network.

The storing and reading unit 59, which is implemented by instructions of the CPU 501, stores various data or information in the storage unit 5000 or reads out various data or information from the storage unit 5000.

<Functional Configuration of Distributed Data Processing Terminal>

As illustrated in FIG. 8, the distributed data processing terminal 6a includes a transmitter and receiver 61, an acceptance unit 62, a determiner 63, a display control 67, and a storing and reading unit 69. These units are functions that are implemented by or that are caused to function by operating any of the elements illustrated in FIG. 5 in cooperation with the instructions of the CPU 501 according to the control program expanded from the EEPROM 504 to the RAM 503 in the distributed data processing terminal 6a.

The distributed data processing terminal 6a further includes a storage unit 6000, which is implemented by the ROM 502, RAM 503 and EEPROM 504 illustrated in FIG. 5. The storage unit 6000 stores verification data. The storage unit 6000 further stores a verification data management DB 6001. The verification data management DB 6001 is implemented by a verification data management table, which will be described below. The verification data may be stored in a memory of any data management server other than the distributed data processing terminal 6a.

(Verification Data Management Table)

FIG. 9B is a conceptual diagram illustrating the verification data management table according to the embodiment. The verification data management table stores, for each one of a plurality of persons to be verified, a file name of an image file (such as a facial image) as the verification data and a name of a person identified with a facial image.

(Functional Configuration of Distributed Data Processing Terminal)

The transmitter and receiver 61 of the distributed data processing terminal 6a, which is implemented by the far-distance communication circuit 511, the antenna 511a, and the instructions of the CPU 501, transmits or receives various data (or information) to or from the centralized data processing server 7a via a communication network (the Internet 600). For example, the transmitter and receiver 61 transmits a verification request for verifying the data to be verified using the verification data, to the centralized data processing server 7a, or performs processing on the verification result sent from the centralized data processing server 7a.

The acceptance unit 62 is implement by the touch panel 521 of the distributed data processing terminal 6, which operates under control of the CPU 501, to receive various selections or inputs from the user.

The determiner 63, which is implemented by instructions of the CPU 501 of the distributed data processing terminal 6a, performs various determinations.

The display control 67, which is implemented by the instructions of the CPU 501 of the distributed data processing terminal 6a, controls the display 517 to display various screens.

The storing and reading unit 69, which is implemented by instructions of the CPU 501 of the distributed data processing terminal 6a, stores various data or information in the storage unit 6000 or reads out various data or information from the storage unit 6000. For example, the storing and reading unit 69 stores the verification data (in this case, the face image data) in the storage unit 6000 according to a registration request received at the acceptance unit 62.

<Functional Configuration of Centralized Data Processing Server>

As illustrated in FIG. 8, the centralized data processing server 7a includes a transmitter and receiver 71, an acceptance unit 72, a feature value generator 74, a verification unit 75, a display control 77, and a storing and reading unit 79. These units are functions that are implemented by or that are caused to function by operating any of the elements illustrated in FIG. 6 in cooperation with the instructions of the CPU 701 according to the control program expanded from the HD 704 to the RAM 703 in the centralized data processing server 7a.

The centralized data processing server 7a further includes a storage unit 7000, which is implemented by the ROM 702, the RAM 703 and the HD 704 illustrated in FIG. 6. The storage unit 7000 stores feature value data to be used for verification, which will be described below.

(Functional Configuration of Centralized Data Processing Server)

The transmitter and receiver 71 of the centralized data processing server 7a, which is implemented by the network I/F 709 and the instructions of the CPU 701, transmits or receives various data (or information) to or from the distributed data processing terminal 6a via a communication network (the Internet 600). For example, the transmitter and receiver 71 receives a verification request for verifying the data to be verified using the verification data, from the distributed data processing terminal 6a, or sends the verification result to the distributed data processing terminal 6a.

The acceptance unit 72 is implement by the keyboard 711 or mouse 712, which operates under control of the CPU 701, to receive various selections or inputs from the user.

The feature value generator 74, which is implemented by the instructions of the CPU 701, generates parameters of feature values from the data to be verified (partial image data) and the verification data that are received at the transmitter and receiver 71.

The verification unit 75, which is implemented by the instructions of the CPU 701, compares the feature values between the verification data and the data to be verified, using the feature values obtained at the feature value generator 74, to calculate a score (in points) indicating the similarity in feature values. The display control 77, which is implemented by the instructions of the CPU 701, controls the display 708 to display various screens.

The storing and reading unit 79, which is implemented by the instructions of the CPU 701, stores various data or information in the storage unit 7000 or reads out various data or information from the storage unit 7000.

<<Operation>>

Figure 10:
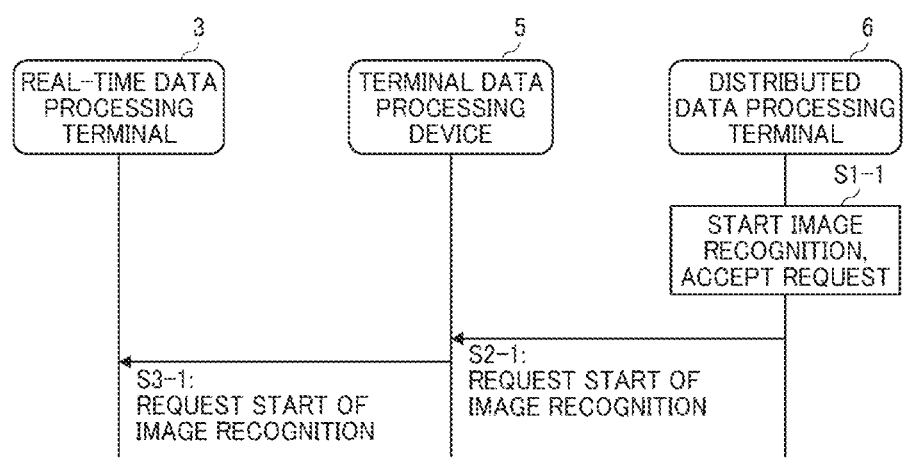
FIG. 10 is a sequence diagram illustrating operation of processing an image recognition start request, performed by the communication system of FIG. 1, according to the first example of the embodiment.

Referring to FIGS. 10 to 19, operation of capturing the image and displaying the image, performed by the communication system 1, is described according to the first example of the embodiment. FIG. 10 is a sequence diagram illustrating operation of processing an image recognition start request, performed by the communication system 1, according to the first example of the embodiment.

As illustrated in FIG. 10, in the distributed data processing terminal 6a, the acceptance unit 62 accepts a request to start image recognition from the user (S1-1). In this example, the distributed data processing terminal 6a displays a screen to the user using a GUI (Graphical User Interface), which allows the user to input an instruction. In other words, the distributed data processing terminal 6a provides a user interface for the real-time data processing terminal 3.

In response to a user instruction, the transmitter and receiver 61 of the distributed data processing terminal 6a transmits a request to start image recognition to the terminal data processing device 5 (S2-1). The transmitter and receiver 51 of the terminal data processing device 5 receives the image recognition start request.

The communication unit 58 of the terminal data processing device 5 transmits the image recognition start request to the real-time data processing terminal 3 (S3-1). The communication unit 48 of the real-time data processing terminal 3 receives the image recognition start request.

Since the user interface is separate from the real-time data processing terminal 3, remote control of the real-time data processing terminal 3 is made possible from the distributed data processing terminal 6a that provides a user interface for the real-time data processing terminal 3.

Figure 11:
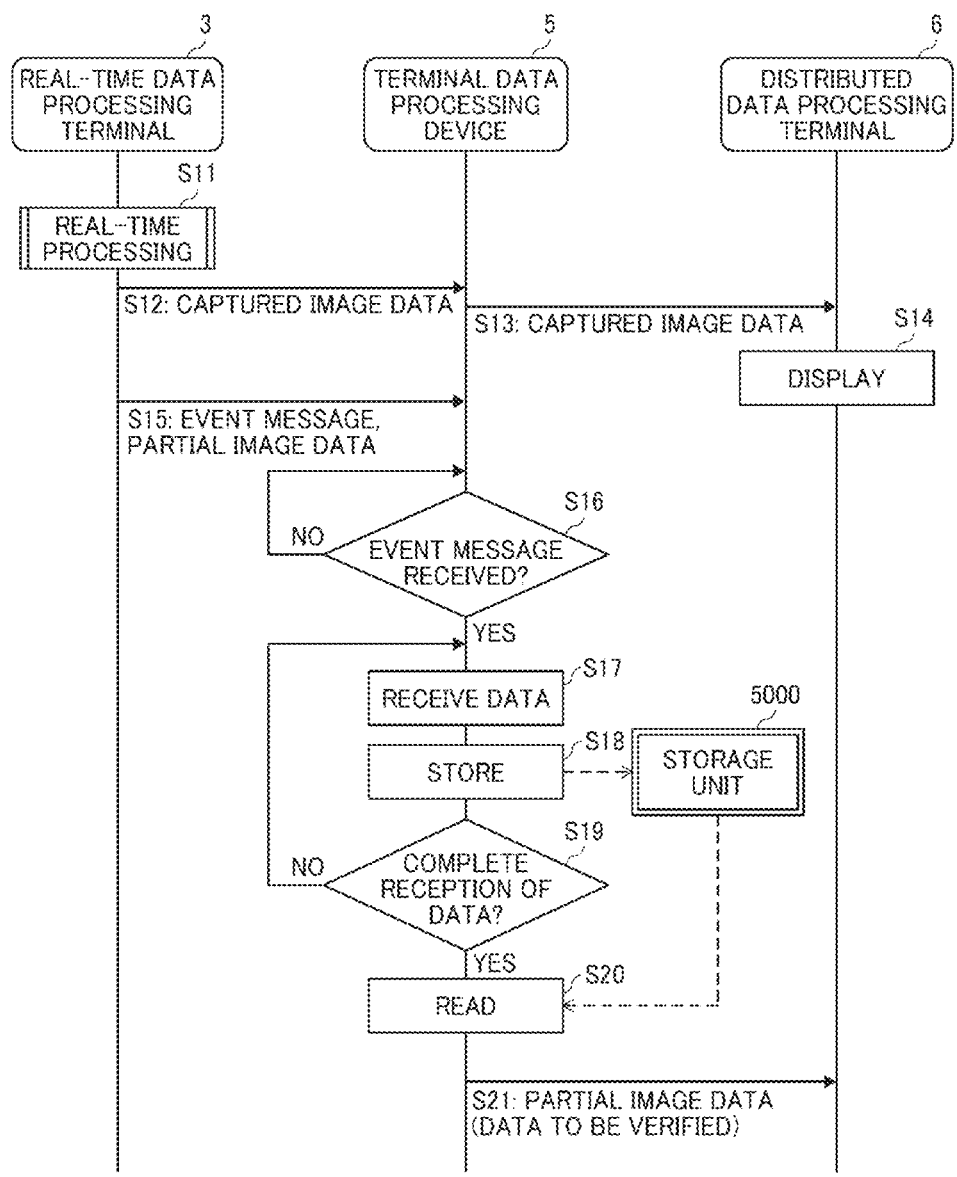
FIG. 11 is a sequence diagram illustrating processing of image recognition, performed by the communication system of FIG. 1, according to the first example of the embodiment.
Figure 12:
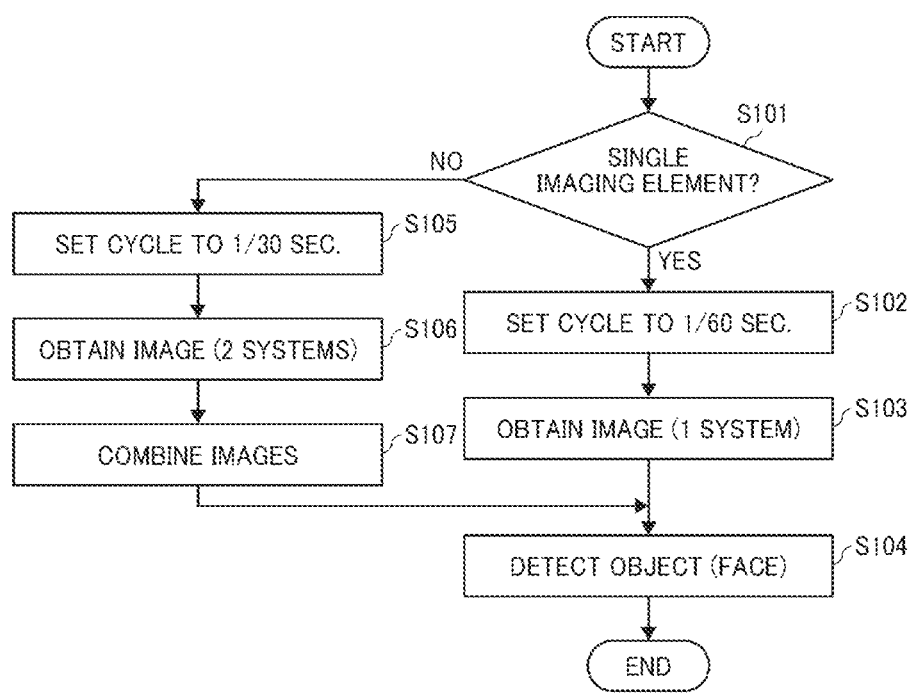
FIG. 12 is a flowchart illustrating an example of object detection processing, performed in the real-time processing, according to the first example of the embodiment.

Next, referring to FIG. 11, image recognition processing is described according to the first example of the embodiment. FIG. 11 is a sequence diagram illustrating an example of image recognition processing, performed by the communication system 1, according to the first example of the embodiment. The real-time data processing terminal 3 performs real-time processing (S11). In the following, real time processing is described with reference to FIGS. 12 and 13. FIG. 12 is a flowchart illustrating an example of object detection processing, performed in the real-time processing.

First, the determiner 33 determines whether or not a number of imaging elements in the imaging unit 40, connected to the real-time data processing terminal 3, is one (S101). More specifically, the storing and reading unit 39 searches the imaging element number management DB 3001 using the product number of the imaging unit 40, acquired from the imaging unit 40 at the connection unit 38, as a search key, to read the number of imaging elements associated with the acquired product number. Accordingly, the determiner 33 determines the number of imaging elements of the imaging unit 40.

If the number of imaging elements is one (S101: YES), the image processing unit 34 sets a cycle time, which defines a time interval for repeating the real-time processing, to 1/60 seconds (S102). Next, the connection unit 38 acquires captured image data, from the imaging unit 40 having one imaging system (here, the imaging unit 40a) (S103). The captured image data is digital image data, and is, for example, data of 4K image (3840 image pixel width X 2160 image pixel height).

Next, the object detector 35 searches for feature points in the captured image data, as a candidate of a specific object, to detect the specific object (S104). Specifically, the object detector 35 picks up a rectangular section, one by one, starting from the edge of the captured image, to search for features points that match the shape model data of the object that is previously stored in the storage unit 3000, and specifies a position (coordinates) of the feature points that match the shape model data.

The processing of S104 may be performed using any desired known method, such as the method described in, for example, Hitoshi IMAOKA, et. al., "Face recognition technology and its application: features on elemental technologies and solutions supporting public safety", Biometrics authentication, NEC Technical Journal, Vol. 63, no. 3, pp. 26-30, 09/2010.

On the other hand, when the number of imaging elements is not one (S101; NO), the image processing unit 34 sets a cycle time for repeating the real-time processing, to 1/30 seconds (S105). The cycle time is set to 1/30 seconds, which is longer than a time it requires for one input, thus preventing the later-described image synthesis processing from delaying.

Next, the connection unit 38 acquires two items of captured image data from the imaging unit 40 having two imaging systems (the imaging unit 40b) (S106). The two items of captured image data are data of hemispherical images as illustrated in FIGS. 4A and 4B, respectively.

Then, the image processing unit 34 combines the two items of captured image data to create an equirectangular projection image EC as illustrated in FIG. 4C (S107). The operation then proceeds to S104, and the object detector 35 detects the feature points of the object in data of the equirectangular projection image EC, to detect the object.

Since the real-time data processing terminal 3 operates under control of the operating system that operates in real-time, the repeating processing of S101, from S102 to S104, and to S213, and the repeating processing of S101, from S105 to S104, and to S213, are performed at high speed, for example, at the cycle time of 1/60 seconds.

As illustrated in FIG. 11, the communication unit 48 of the real-time data processing terminal 3 transmits captured image data to the communication unit 58 of the terminal data processing device 5 (S12). The transmitter and receiver 51 of the terminal data processing device 5 transmits the captured image data received at S12 to the transmitter and receiver 61 of the distributed data processing terminal 6a (S13). Accordingly, the display control 67 of the distributed data processing terminal 6a causes the display 517 to display a captured image as illustrated in FIG. 14A in real time (S14).

Figure 14A:
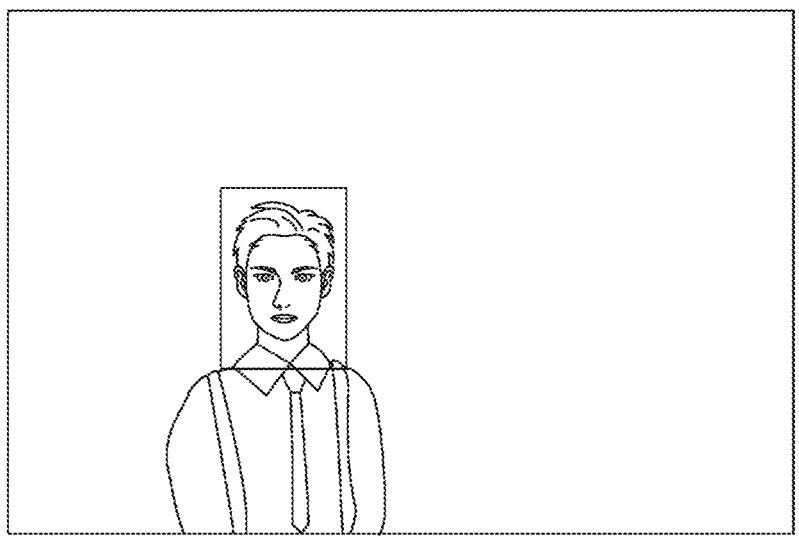
FIGS. 14A and 14B (FIG. 14) are each an illustration of an example captured image, displayed at the distributed data processing terminal, according to the embodiment.
Figure 14B:
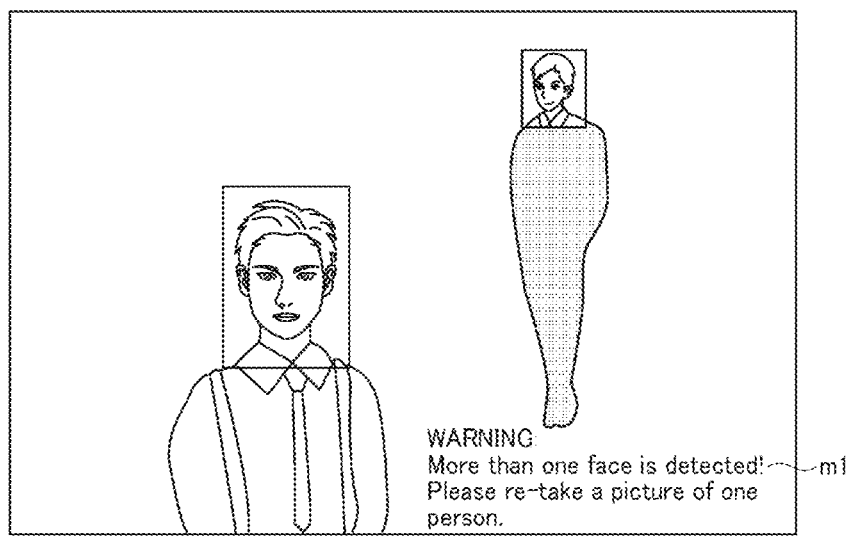

FIGS. 14A and 14B are each an illustration of an example captured image, displayed at the distributed data processing terminal 6. The captured image is displayed with a frame that indicates a rectangle having a detected object (in this case, a detected human face). The above-described S12 to S14 correspond to process to stream data.

Next, referring to FIG. 13, processing of event generation, performed in the real-time processing, is described according to the first example. FIG. 13 is a flowchart illustrating an example of event generation processing, performed in the real-time processing.

When the object detector 35 does not detect an object (in this case, a human face) at S104 (S211: NO), the operation returns to S103 in case of the imaging unit 40 with one imaging system, and to S106 in case of the imaging unit 40 with two imaging systems. On the other hand, when the object detector 35 detects an object (in this case, a human face) at S104 (S211: YES), the operation proceeds to S212.

At S212, the object detector 35 determines whether the detected object is one or more than one. When the object detector 35 detects a plurality of objects (here, two or more human faces) at S104 (S212: NO), the display control 37 displays a captured image having the objects, with a message m1, as illustrated in FIG. 14B (S213). This message m1 could be any content as long as it can trigger a user's action to capture an image that includes only one object (one human face). After S213, the operation returns to S103 in the case of the imaging unit 40 with one imaging system, and to S106 in the case of the imaging unit 40 with two imaging systems.

On the other hand, when the object detector 35 detects only one object (here, a human face) at S104 (S212: YES), the display control 37 displays the captured image without the message m1 of FIG. 14B (S 214). For example, when the message m1 is already displayed for the captured image that is previously displayed, the display control 37 stops displaying the message m1.

Next, the object detector 35 encodes the partial image data, which is a part of the captured image that includes the detected human face, in a general-purpose format such as JPEG (S215). The event generator 36 ​​ generates an event message notifying that the partial image data is transmitted to the terminal data processing device 5 (S216). Specifically, the event generator 36 ​​ generates the event message m2 such as "Send".

The real-time processing of S11 illustrated in FIG. 11 then ends, to proceed to S12 to S14 as described above.

The communication unit 48 transmits the event message m2 generated at S216 and the partial image data detected at S104 to the communication unit 58 of the terminal data processing device 5 (S15). When a plurality of objects (in this case, human faces) are detected at S104, at S15, a plurality of items of partial image data are transmitted together with one event message m2. When real-time detection of an object (human face) is not necessary, such as in the example case where the distributed processing system 100 is disposed in a shop or the like, the real-time data processing terminal 3 may accumulate the event message m2 and the partial image data in its local memory during a day, when the shop is opened. After the shop is closed, for example, during the night, the real-time data processing terminal 3 may transmit the event message m2 and the partial image data to the terminal data processing device 5.

Next, the data detector 56 of the terminal data processing device 5 detects whether or not the event message m2 "Send" is received at the communication unit 58 (S16). When the event message m2 is received (S16: YES), the communication unit 58 receives the partial image data transmitted together with the event message m2 (S17). The storing and reading unit 59 temporarily stores the partial image data in the storage unit 5000 (S18).

Next, the data detector 56 monitors for the partial image data to determine whether reception of the partial image data is completed or not (S19). The processing of S19 is repeated until all items of partial image data is received for all of event messages m2 that are received (S19: NO). When reception of the partial image data is completed (S19: YES), the storing and reading unit 59 reads partial image data, each having been transmitted with the event message m2 and temporarily stored in the storage unit 5000 (S20).

The transmitter and receiver 51 transmits all items of partial image data read out at S20 to the transmitter and receiver 61 of the distributed data processing terminal 6a via the intranet 200 (S21). Accordingly, the transmitter and receiver 61 of the distributed data processing terminal 6a receives all items of partial image data. The partial image data is later used as data to be verified using verification data.

Figure 15:
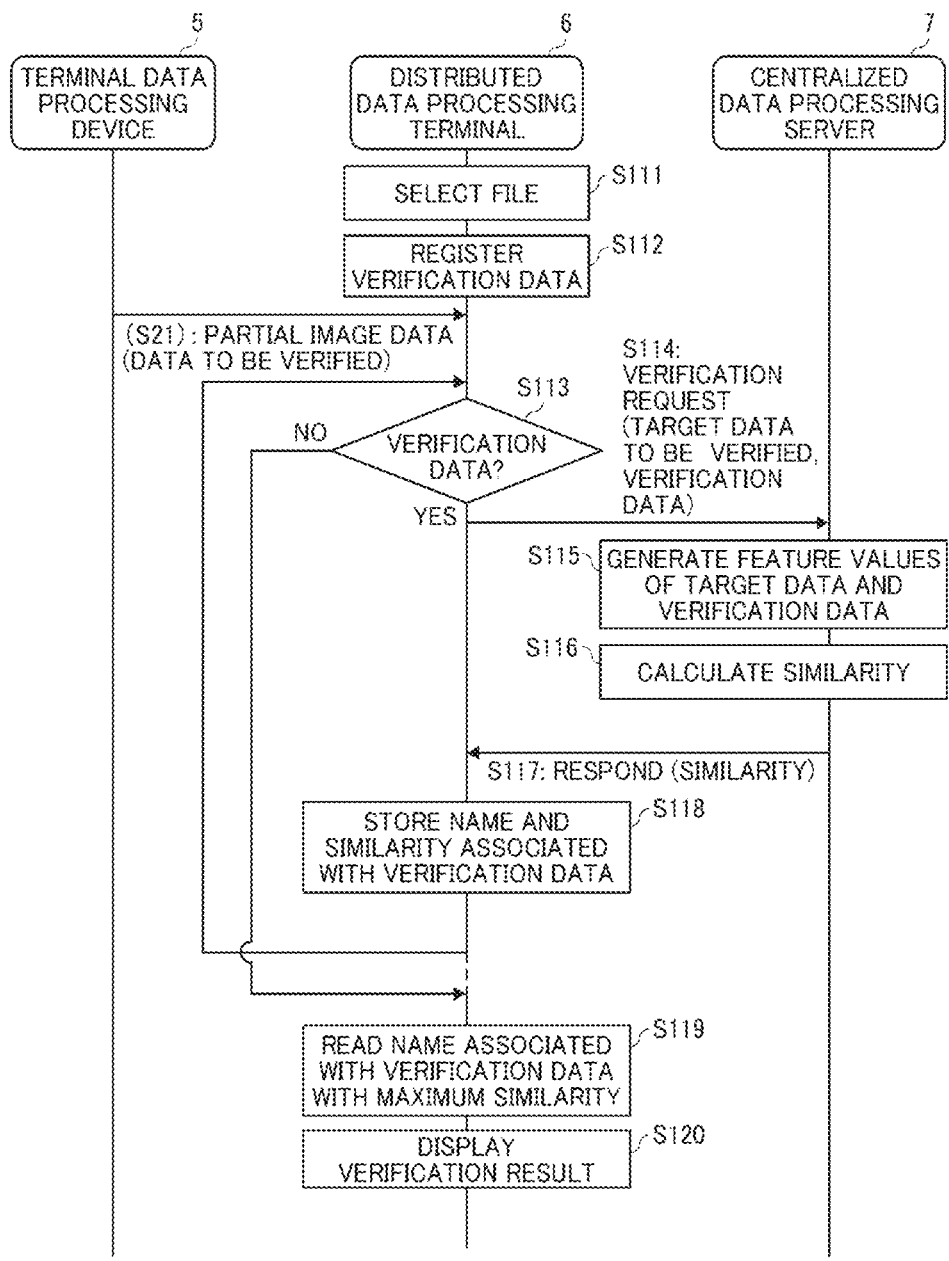
FIG. 15 is a sequence diagram illustrating an example of verification processing, according to the first example of the embodiment.
Figure 16A:
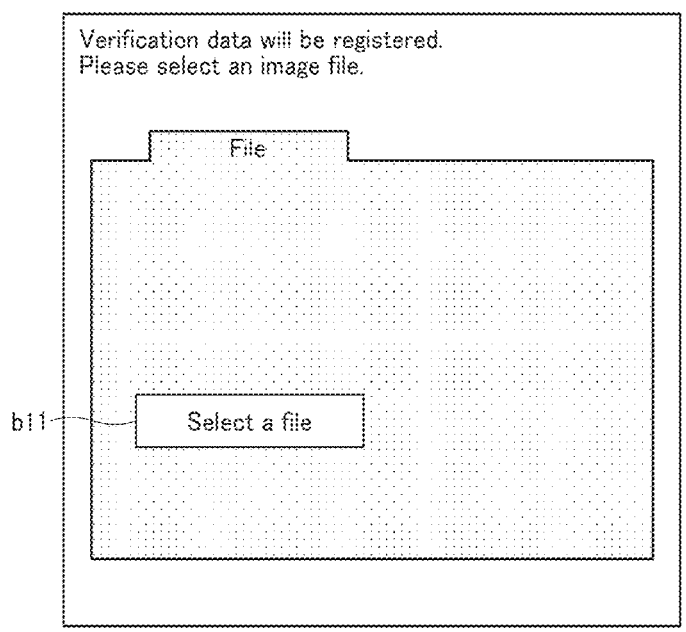
FIG. 16A is an illustration of an example file selection screen for selecting verification data, displayed at the distributed data processing terminal.
Figure 16B:
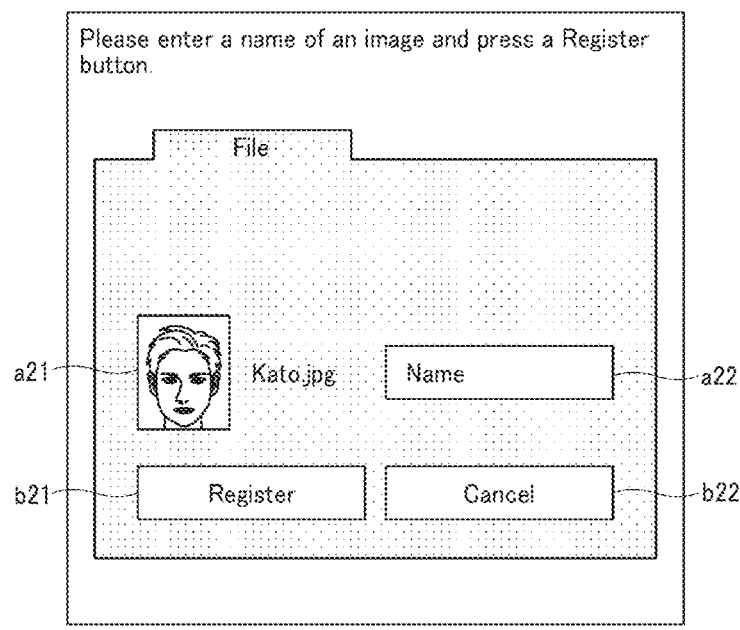
FIG. 16B is an illustration of an example registration screen for registering verification data, displayed at the distributed data processing terminal, according to the embodiment.
Figure 17:
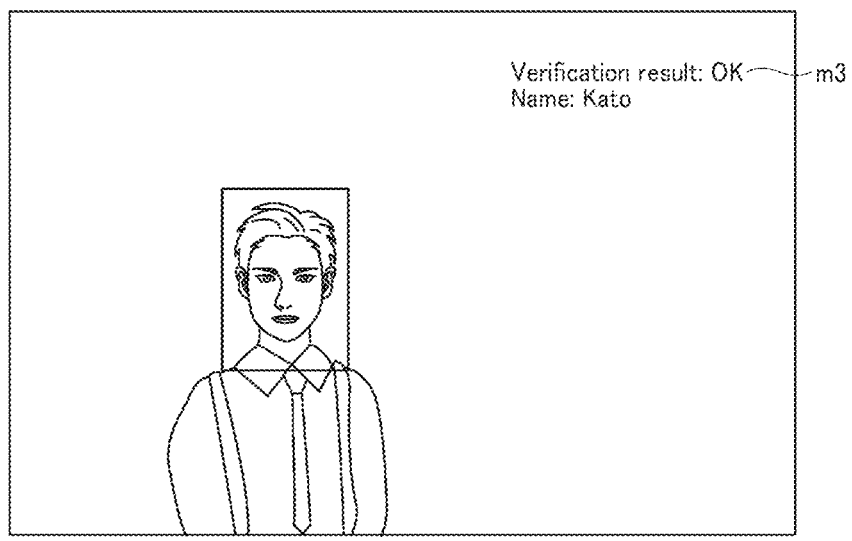
FIG. 17 is an illustration of an example screen with a verification result message, displayed at the distributed data processing terminal, according to the embodiment.

Next, with reference to FIGS. 15 to 17, processing of verifying data to be verified, i.e., the partial image data, using the registered verification data is described, according to the first example. FIG. 15 is a sequence diagram illustrating processing of verifying the data to be verified, according to the first example of the embodiment. FIG. 16A is an illustration of an example file selection screen for selecting verification data, displayed at the distributed data processing terminal 6a. FIG. 16B is an illustration of an example registration screen for registering verification data, displayed at the distributed data processing terminal 6a.

FIG. 17 is an illustration of an example screen with a verification result message m3, displayed at the distributed data processing terminal 6a.

To register the verification data, the user operates the distributed data processing terminal 6a to cause the display control 67 to display the file selection screen as illustrated in FIG. 16A for allowing selection of verification data to be registered.

When the user selects an image to be registered (in this case, a facial image) after pressing the "Select file" button b11, the acceptance unit 62 accepts the selection of the image file to be registered (S111).

As illustrated in FIG. 16B, the display control 67 controls the display 517 to display the registration screen for registering the verification data that is selected. The registration screen illustrated in FIG. 16B includes a selected image file (an image and a file name) a21, a name entry field a22, a "Register" button b21, and a "Cancel" button b22.

After confirming that the selected image file a21 is the desired image file (an image and a file name), the user enters a name of the image file to be registered as verification data in the name entry field a22, and then presses the "Register" button b21. For example, the user may enter a name of a specific object (i.e., an individual) in the image file, as the name to be registered for the selected image file.

In response to pressing of the "Register" button b21, the acceptance unit 62 accepts registration of the verification data, and the storing and reading unit 79 registers the selected image file as the verification data (S112). Specifically, the storing and reading unit 69 stores, in the verification data management DB 6001, the file name a21 and the name entered in the name entry field a22 in association with each other.

When the selected image file a21 is not the desired image file, the user presses the "Cancel" button b22 to cause the display 517 to display the file selection screen illustrated in FIG. 16A.

As described above, the verification data is registered directly to the distributed data processing terminal 6a, rather than registering to the terminal data processing device 5. This sufficiently reduces the load on communication network, caused due to communication between the terminal data processing device 5 and the distributed data processing terminal 6a.

The above-described S111 and S112 of registering the image file as the verification data to be used for verification may be performed at any time. Further, as described below referring to the case of a fifth example, the verification data management DB 6001 may be provided at any location, for example, independently from the distributed data processing terminal 6a, as long as the distributed data processing terminal 6a is able to access the verification data management DB 6001.

After the transmitter and receiver 61 of the distributed data processing terminal 6a receives the partial image data at S21, the storing and reading unit 69 searches the verification data management DB 6001 to determine whether there is any verification data that has been registered (S113). When it is determined that there is any verification data being registered, the transmitter and receiver 61 transmits verification request information, i.e., a verification request to the centralized data processing server 7a via the Internet 600 (S114). The verification request includes verification data (target data to be verified) and data to be verified.

The centralized data processing server 7a receives the verification request at the transmitter and receiver 71. Specifically, one or more items of verification data in the verification data management table illustrated in FIG. 9B are transmitted, sequentially, from the verification data listed at the top. That is, the verification data that is read first and the data to be verified that is received at S21 are transmitted with a verification request. As a next verification request, the verification data that is read next (target data to be verified) and the verification data received at S21 for the next time are transmitted.

Next, in the centralized data processing server 7a, the feature value generator 74 decodes both data (verification data and data to be verified) into bitmap data, and calculates parameters of feature values for each of both data (S115). Such feature value parameters are used to identify an individual using various types of information that can be discriminative such as height or slope of facial components such as a nose or eyes detected in the facial image.

The verification unit 75 compares the feature value parameters between the verification data and the data to be verified, and calculates the degree of similarity between these data (S116). The similarity may be calculated using any desired method, such as the method based on a deep neural network (DNN: Deep Neural Network), described in Takayuki OKATANI, "Deep learning and image recognition: basic and recent trends (<Special feature> Neuroscience and mathematical modeling)" Operations research: Management science 60 (4), 198-204, 2015-04-01. The feature value parameters of the verification data are an example of a first feature value parameter, and the feature value parameters of the data to be verified are an example of a second feature value parameter.

Next, the transmitter and receiver 71 of the centralized data processing server 7a transmits a response to the verification request received at S114 to the transmitter and receiver 61 of the distributed data processing terminal 6a via the Internet 600 (S117). The response includes the degree of similarity, which is calculated at S116 as the verification result. The transmitter and receiver 61 of the distributed data processing terminal 6a receives the response including the verification result.

Next, in the distributed data processing terminal 6a, the storing and reading unit 69 temporarily stores, in the storage unit 6000, the "name" assigned to the verification data included in the verification request transmitted at S114 and the "similarity" received at S117 in association (S118). The above-described processing from S113 is performed on verification data listed next in the verification data management table in FIG. 9B.

On the other hand, when it is determined at S113 that there is no verification data being registered (including cases where there is absolutely no verification data), the operation proceeds to S119. The storing and reading unit 69 reads the "name" assigned to the verification data having the maximum degree of similarity, from all of verification data temporarily stored in the storage unit 6000 (S119).

The display control 67 controls the display 517 of the distributed data processing terminal 6a, to display the verification result message as illustrated in FIG. 17, on the real-time captured image as illustrated in FIG. 14A (S120). The verification result message m3 includes a "verification result" and a "name" assigned to the verification data having the maximum degree of similarity.

As described above, according to the present example, as illustrated in FIG. 7, the real-time data processing terminal 3 extracts partial image data, which is data to be verified, from the captured image data using the image recognition application AP1. The terminal data processing device 5 transmits the partial image data to the distributed data processing terminal 6a using the communication application AP2. With this configuration, the processing load is distributed between the real-time data processing terminal 3 and the terminal data processing device 5. Accordingly, the real-time data processing terminal 3 is able to constantly repeat the real-time processing of capturing images, with the cycle time of 1/60 seconds.

In particular, even when a plurality of real-time data processing terminals 3 are provided on the intranet 200, since the terminal data processing device 5 communicates with the distributed data processing terminal 6a, each real-time data processing terminal 3 is able to constantly repeat the real-time processing of capturing images with the cycle time of 1/60 seconds without being interrupted by communication.

Furthermore, the terminal data processing device 5 is located at a location that is physically close to the real-time data processing terminal 3 to establish one-to-one connection, compared with a physical distance between the real-time data processing terminal 3 and each one of the distributed data processing terminal 6a and the centralized data processing server 7a. Accordingly, data can be transmitted at high speed, reducing a processing time for obtaining the verification result.

In addition, even when the number of imaging elements changes due to different imaging units 40 as illustrated in FIG. 3, the image acquisition terminal 2 is not affected by the number of imaging units.

Since the real-time data processing terminal 3 outputs the partial image data, instead of the entire captured image data, a size (or an amount) of data to be transmitted from the image acquisition terminal 2 to the distributed data processing terminal 6a via the intranet 200 is sufficiently reduced. This sufficiently suppress the amount of data transmitted via the intranet 200 and the Internet 600.

Furthermore, the real-time data processing terminal 3 encodes the partial image data into a compressed format, such that a size of data transmitted from the terminal data processing device 5 to the distributed data processing terminal 6a via the intranet 200 is further reduced.

When a plurality of human faces are detected, as illustrated in FIG. 14B, a message the requests to take a picture of one person is displayed. With this message, the real-time data processing terminal 3 processes a facial image of only one person at a time, thus improving the accuracy in face recognition to ensure the security.

Second Example

Figure 18:
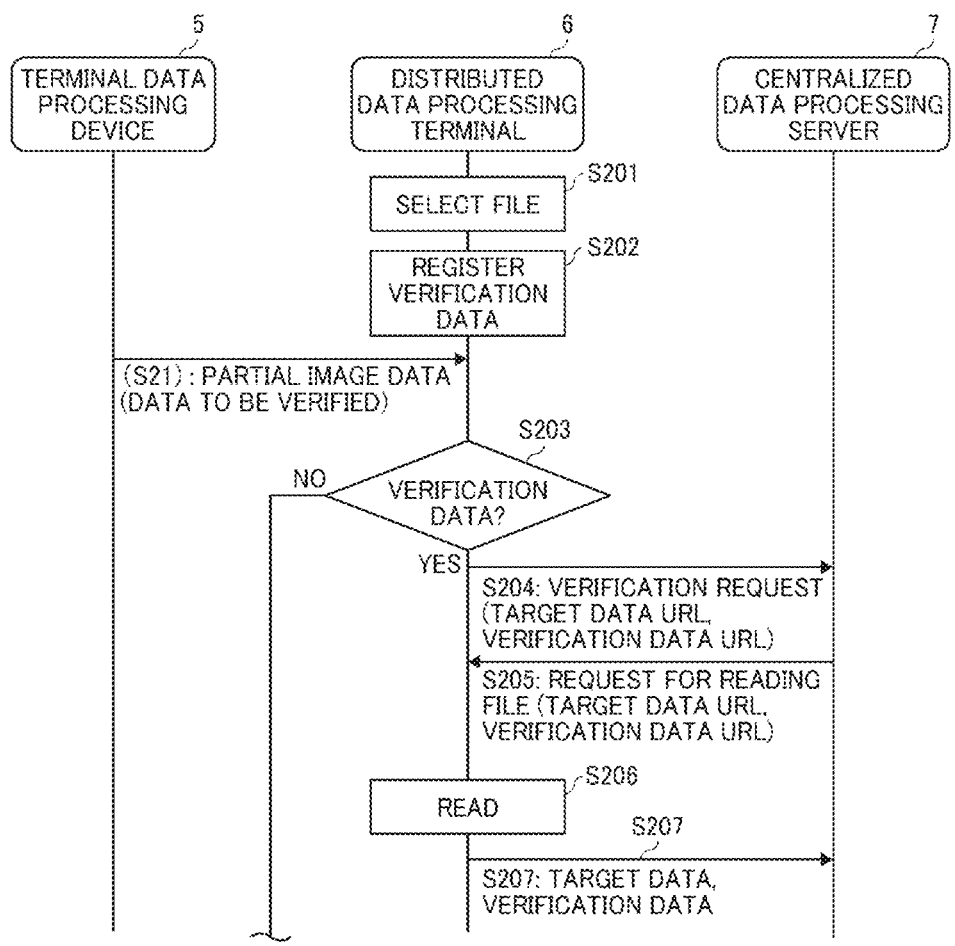
FIG. 18 is a sequence diagram illustrating a modified example of verification processing described above referring to FIG. 15, according to the second example of the embodiment.

Referring to FIG. 18, a functional configuration of the communication system 1, and operations to be performed by the communication system 1, are described according to a second example of the above-described embodiment. FIG. 18 is a sequence diagram illustrating another example of verification processing described above referring to FIG. 15. Note that, in this second example, the configuration, function, and processing are substantially the same as those in the first example except that the verification processing of FIG. 15 is replaced with the verification processing illustrated in FIG. 18, so that the description other than the operation of FIG. 18 is omitted. Further, in the second example, registration of verification data is performed in advance through processing of S111 and S112 as described above for the first example. Further, the verification data need not be stored in the storage unit 6000 of the distributed data processing terminal 6a, but may be stored in any other device such as a data management server.

Referring to FIG. 18, S201, S202, S21, and S203 are performed in a substantially similar manner as described above referring to S111, S112, S21, and S113 in FIG. 15.

The transmitter and receiver 61 of the distributed data processing terminal 6a transmits verification request information, i.e., a verification request, to the centralized data processing server 7a via the Internet 600 (S204). The verification request includes a Uniform Resource Locator (URL) indicating a location at which the data to be verified is stored and a URL indicating a location at which the verification data is stored. The centralized data processing server 7a receives the verification request at the transmitter and receiver 71.

When starting the verification processing (feature value generation and similarity calculation), the transmitter and receiver 71 of the centralized data processing server 7a transmits a request for reading the file of the data to be verified by accessing the URL of a storage location of the data to be verified, and a request for reading the file of the verification data by accessing the URL of a storage location of the verification data (S205).

Here, since the distributed data processing terminal 6a stores the files of the verification data and the data to be verified, the transmitter and receiver 71 of the centralized data processing server 7a sends a request for reading the files of the verification data and the data to be verified to the transmitter and receiver 61 of the distributed data processing terminal 6a.

When the verification data and data to be verified are managed at the data management server described above, the transmitter and receiver 71 of the centralized data processing server 7a transmits a request for reading the files of the verification data and the data to be verified to the data management server.

Next, in the distributed data processing terminal 6a, the storing and reading unit 69 reads the files of the verification data and the data to be verified, in response to the request for reading (S206). The transmitter and receiver 61 transmits the verification data and the data to be verified, to the transmitter and receiver 71 of the centralized data processing server 7a (S207). Since the processing after S207 is the same as that of the first example illustrated in FIG. 15, description thereof is omitted.

As described above, according to the second example, the centralized data processing server 7a does not always request the verification data and the data to be verified, but requests the verification data and the data to be verified only when verification processing is to be started. This increases a memory area of the storage unit 7000 of the centralized data processing server 7a, thus preventing the performance of the centralized data processing server 7a from lowering.

Third Example

Figure 19:
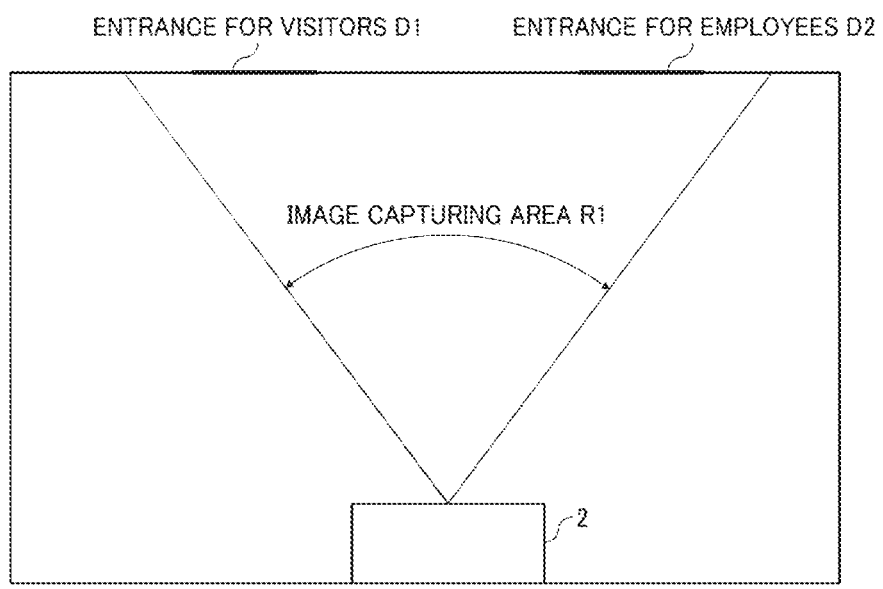
FIG. 19 is a diagram illustrating an example layout of a certain room in which the image acquisition terminal is provided, according to the third example of the embodiment.
Figure 20:
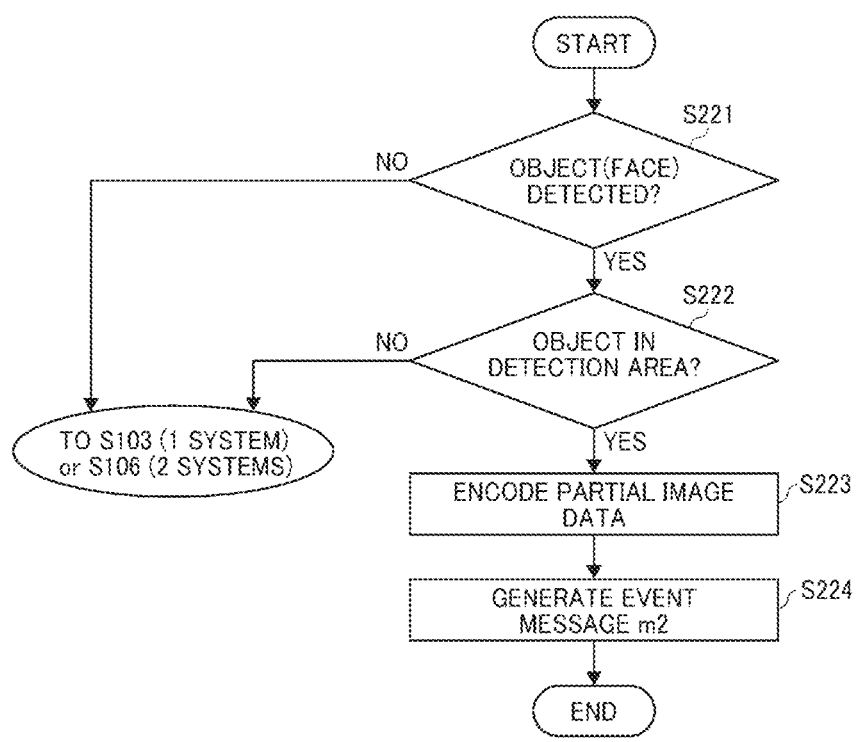
FIG. 20 is a flowchart illustrating a modified example of event generation processing described above referring to FIG. 13, performed in the real-time processing, according to the third example of the embodiment.
Figure 21:
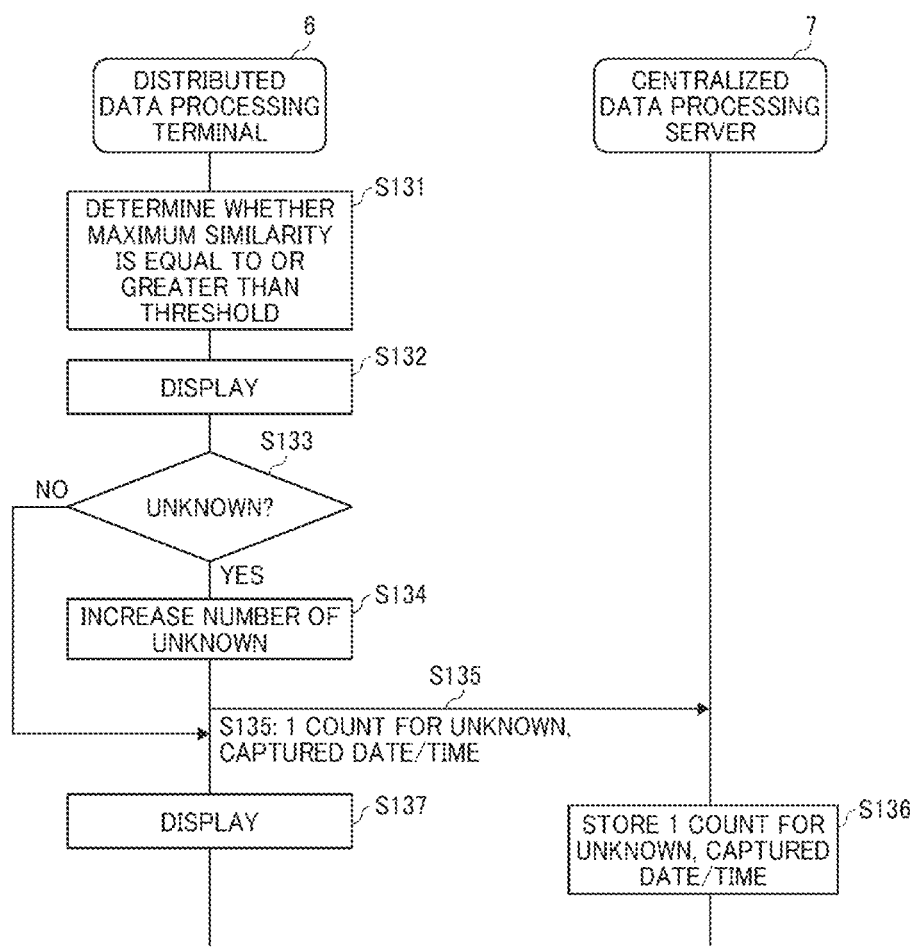
FIG. 21 is a sequence diagram illustrating a modified example of verification processing described above referring to FIG. 15, according to the third example of the embodiment.

Referring to FIGS. 19 to 21, a functional configuration of the communication system 1, and operations to be performed by the communication system 1, are described according to a third example of the embodiment.

FIG. 19 is a diagram illustrating an example layout of a certain room in which the image acquisition terminal 2 is provided. In the following, an image capturing area R1 of the image acquisition terminal 2 is reduced by half, so as to only cover the left half of the image capturing area R1, rather than covering the entire image capturing area R1. For example, when the image acquisition terminal 2 is used as a surveillance camera, the entrance D2 at a right side is exclusively for employees, such that there is a low chance that a suspicious person enters from the entrance D2. On the other hand, the entrance D1 at a left side is for guests, such that a suspicious individual may enter from the entrance D2. Accordingly, in this example, a detection range of the object is limited to the left half of the image capturing area R1. Depending on a layout of a particular room, a detection range of the object may be a right half, an upper half, a lower half, or the like. Further, the image capturing area R1 may not only divided by two, but divided into four, for example, such that the number of divisions may be changed depending on application of the image acquisition terminal 2.

FIG. 20 is a flowchart illustrating a modified example of the event generation processing, in the real-time processing, described above referring to FIG. 13 for the first example. FIG. 21 is a flowchart illustrating a modified example of the verification processing, described above referring to FIG. 15 for the first example. Note that, in this third example, the configuration, function, and processing are substantially the same as those in the first example except for replacement of the event generation processing and the verification processing with those illustrated in FIGS. 20 and 21, respectively, so that the description other than the operations in FIGS. 20 and 21 will be omitted.

Referring to FIG. 20, S221 is performed in a substantially similar manner as described above referring to S211 in FIG. 13. When the object detector 35 detects an object (in this case, a human face) at S104 of FIG. 12 (S221: YES), the operation proceeds to S222.

At S222, the object detector 35 determines whether the detected object is within a detection range (S222). When the coordinate (x, y) of the object detected by the object detector 35 is not within the detection range (within the left half of the image capturing area R1 in this case) (S222: NO), the operation returns to S103 in the case when the imaging unit 40 has one imaging system, and to S106 in the case when the imaging unit 401 has two imaging systems.

On the other hand, when the coordinate (x, y) of the object detected by the object detector 35 is within the detection range (within the left half of the image capturing area R1 in this case) (S222: YES), the operation proceeds to S223.

Here, the coordinate (x, y) of the object is represented by the width direction (x) and the height direction (y), with respect to the upper left of the entire captured image as an origin. Specifically, assuming that the width of the entire captured image is W, when the coordinate x is less than (W/2), the result at S222 is YES. When the coordinate x is equal to or greater than (W/2), the result at S222 is NO.

Referring to FIGS. 20, S223 and S224 are performed in a substantially similar manner as described above referring to S215 and S216 in FIG. 13.

Next, with reference to FIG. 21, the processing to be performed by the communication system 1 is described, in an example case in which the communication system 1 is applied to the surveillance camera system. The processing described above referring to S111 to S119 in FIG. 15 is performed, to obtain the degree of similarity between the data to be verified and the verification data.

After S119, the determiner 63 of the distributed data processing terminal 6a determines whether the maximum similarity read out at S119 is equal to or greater than a threshold (for example, the threshold is "0.5" in the case of "1" being an exact match) (S131).

In this case, when the maximum similarity is less than the threshold value, the distributed data processing terminal 6a determines that the object (face) is unknown. Then, the display control 67 causes the display 517 of the distributed data processing terminal 6a to display the verification result message m3 in FIG. 17, with the verification result "unknown" (S132). In this case, the verification result message m3 does not display any name, as there is no person who is identified.

Next, when the distributed data processing terminal 6a determines the object as an unknown person (S133: YES), the storing and reading unit 69 increases the number of unknown persons, managed by the storage unit 6000, by one (S134).

The transmitter and receiver 61 transmits, to the transmitter and receiver 71 of the centralized data processing server 7a, one count indicating the unknown person, being managed by the storage unit 6000, and the date and time when the image of the unknown person is captured at the real-time data processing terminal 3 (S135).

The transmitter and receiver 71 of the centralized data processing server 7a receives one count of unknown person and date and time when the image of unknown person is captured.

In this example, it is assumed that the date and time when the captured image is taken is also transmitted, when the captured image data is transmitted from the real-time data processing terminal 3 to the distributed data processing terminal 6a at S12 and S13 in FIG. 11.

In alternative to the date and time when the captured image is taken, as illustrated in FIG. 11, the date and time at which the terminal data processing device 5 receives the captured image data at S12, or the date and time at which the terminal data processing device 5 transmits the captured image data at S13 may be used.

Alternatively, the date and time when the distributed data processing terminal 6a receives the captured image data at S13 in FIG. 11 may be used.

Furthermore, before S12, the real-time data processing terminal 3 may transmit the location information indicating the location of the real-time data processing terminal 3 to the distributed data processing terminal 6a via the terminal data processing device 5. With this configuration, the distributed data processing terminal 6a can also transmit the location information at S135 with one count of unknown person, such that the centralized data processing server 7a is able to manage the one count of unknown person, the date and time when the image is captured, and the location information in association with one another, for later analysis.

The centralized data processing server 7a may manage a terminal ID (identifier) for identifying the real-time data processing terminal 3 (or the image acquisition terminal 2) and location information indicating the location of the real-time data processing terminal 3 (or the image acquisition terminal 2), in association with each other.

The distributed data processing terminal 6a may then transmit the terminal ID of the real-time data processing terminal 3 that captures the unknown person, in alternative to the location information, at S135. Accordingly, the centralized data processing server 7a can also manage the installation location of the distributed data processing terminal 6a.

As described above, according to this example, the centralized data processing server 7a requires only half the detection range of the object, compared to the above-descried first example. This further reduces frequencies in transmitting the partial image data from the terminal data processing device 5 to the centralized data processing server 7a via the distributed data processing terminal 6a. Accordingly, an amount of data to be transmitted over the intranet 200 and the Internet 600 is further reduced.

Further, the number of unknown persons is stored in the centralized data processing server 7a, which is accessible from the distributed data processing terminal 6a or the like, to allow an authorized user to check the number of unknown persons.

Fourth Example

Figure 22:
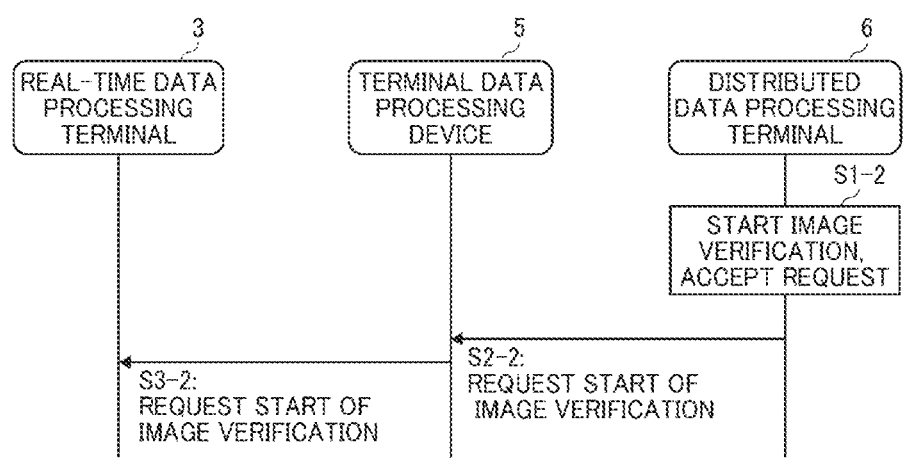
FIG. 22 is a sequence diagram illustrating a modified example of processing the image recognition start request described above referring to FIG. 10, according to the fourth example of the embodiment.
Figure 23:
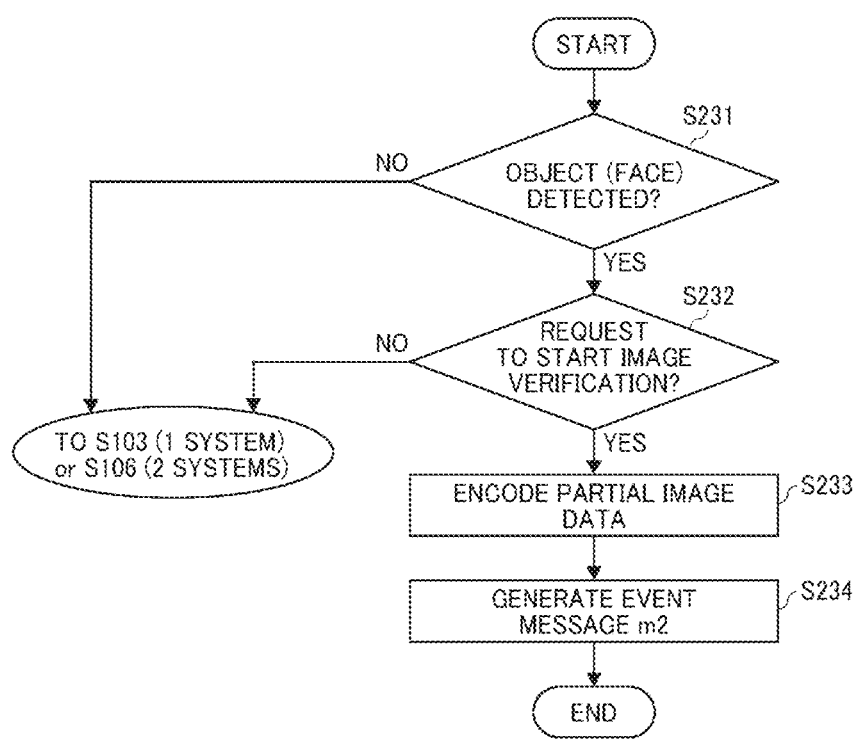
FIG. 23 is a flowchart illustrating a modified example of event generation processing described above referring to FIG. 13, according to the fourth example of the embodiment.

Referring to FIGS. 22 and 23, a functional configuration of the communication system 1, and operations to be performed by the communication system 1, are described according to a fourth example of the embodiment. FIG. 22 is a sequence diagram illustrating a modified example of processing the image recognition start request described above referring to FIG. 10. FIG. 23 is a flowchart illustrating a modified example of event generation processing described above referring to FIG. 13.

The present example illustrates an example case in which the verification processing is not started unless a verification request is transmitted from the distributed data processing terminal 6. Note that, in this example, the configuration, function, and processing are substantially the same as those in the first example except for the image recognition processing and the event generation processing illustrated in FIGS. 22 and 23, respectively, so that the description of the operations other than FIGS. 22 and 23 will be omitted.

After performing S1-1, S2-1, and S3-1 described above referring to FIG. 10, as illustrated in FIG. 22, the acceptance unit 62 of the distributed data processing terminal 6a accepts a request to start image verification from the user (S1-2). In this example, the distributed data processing terminal 6a displays a screen to the user using a GUI (Graphical User Interface), which allows the user to input an instruction. In other words, the distributed data processing terminal 6a provides a user interface for the real-time data processing terminal 3.

The transmitter and receiver 61 of the distributed data processing terminal 6a transmits a request to start image verification to the terminal data processing device 5 (S2-2). The transmitter and receiver 51 of the terminal data processing device 5 receives the image verification start request. The communication unit 58 of the terminal data processing device 5 transmits the image verification start request to the real-time data processing terminal 3 (S3-2). The communication unit 48 of the real-time data processing terminal 3 receives the image verification start request.

As described above, since the user interface is separate from the real-time data processing terminal 3, remote control of the real-time data processing terminal 3 is made possible from the distributed data processing terminal 6a that provides a user interface for the real-time data processing terminal 3.

Next, the real-time data processing terminal 3 performs processing that is substantially similar to the processing in FIG. 12. Thereafter, the processing illustrated in FIG. 23 is performed. In the following, the event generation processing is described referring to FIG. 23.

When the object detector 35 does not detect an object (in this case, a human face) at S104 (S231: NO), similarly to the processing of S211 of FIG. 13 in the first example, the operation returns to S103 in the case when the imaging unit 40 has one imaging system, and to S106 in the case when the imaging unit 40 has two imaging systems. On the other hand, when the object detector 35 detects an object (in this case, a human face) at S104 (S231: YES), the operation proceeds to S232. The determiner 33 determines whether the image verification start request is transmitted from the distributed data processing terminal 6a via the terminal data processing device 5 (S232).

When the determiner 33 determines that the image verification start request is not transmitted (S232: NO), similarly to the processing of S231, the operation returns to S103 in the case when the imaging unit 40 has one imaging system, and to S106 in the case when the imaging unit 40 has two imaging systems. In contrary, when the determiner 33 determines that the image verification start request is transmitted (S232: YES), the real-time data processing terminal 3 performs processing of S233 and 234 that is similar to processing of S215 and S216 of FIG. 13.

As described above, according to the present example, the centralized data processing server 7a performs image recognition only when the user requests for starting of image recognition, such that unnecessary processing can be omitted. This further reduces a frequency of transmitting partial image data from the terminal data processing device 5 to the centralized data processing server 7a via the distributed data processing terminal 6a. Accordingly, an amount of data to be transmitted over the intranet 200 and the Internet 600 is further reduced.

Fifth Example

Referring to FIGS. 24 to 27, a functional configuration of the communication system 1, and operations to be performed by the communication system 1, are described according to a fifth example of the embodiment.

Figure 24:
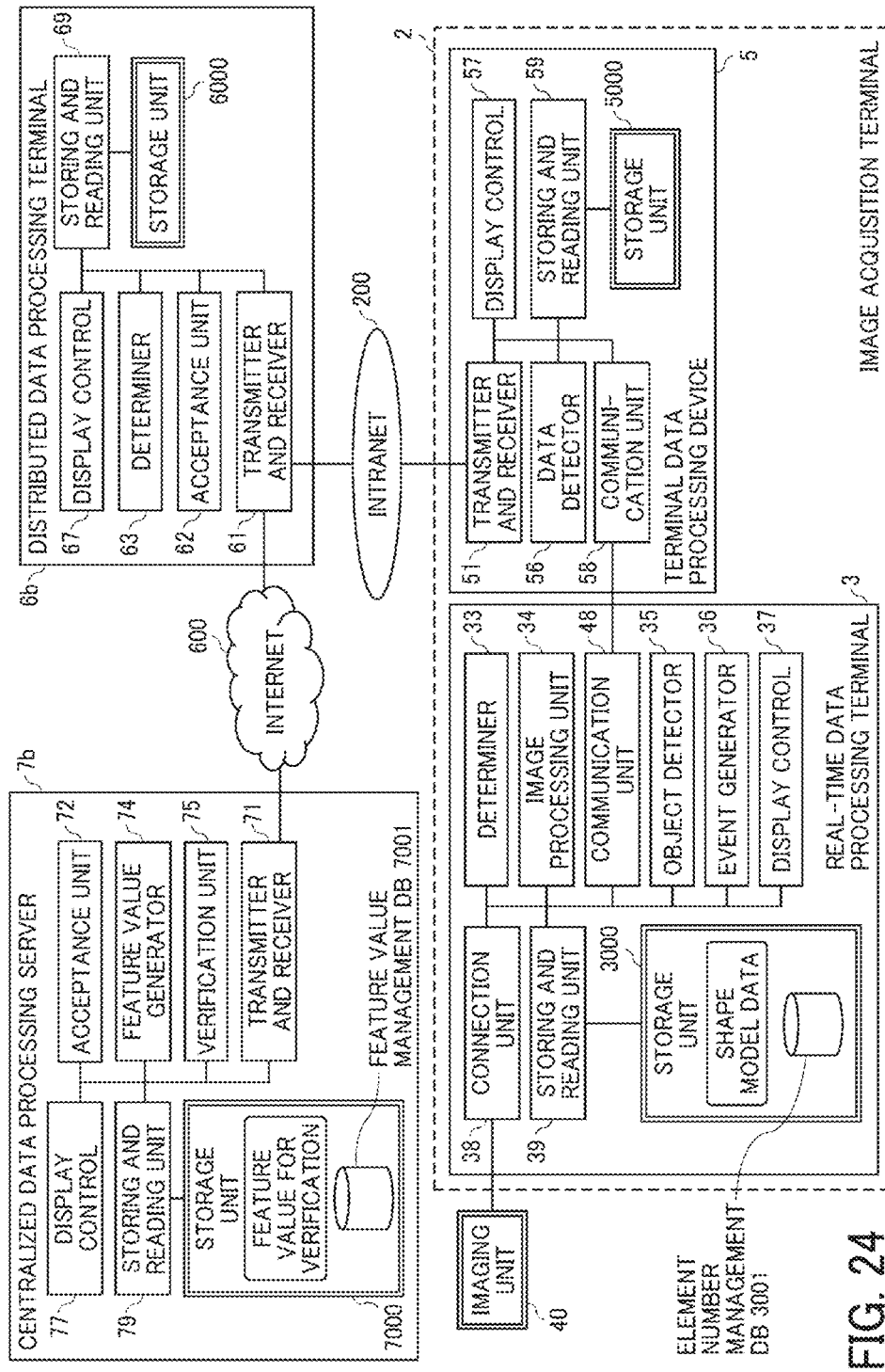
FIG. 24 is a diagram illustrating a functional configuration of the communication system of FIG. 1, according to a fifth example of the embodiment.

FIG. 24 is a diagram illustrating a functional configuration of the communication system 1, according to the fifth example of the embodiment. In FIG. 24, a distributed data processing terminal 6b is illustrated as an example of the distributed data processing terminal 6 in FIG. 1. Further, in FIG. 24, a centralized data processing server 7b is illustrated as an example of the centralized data processing server 7 in FIG. 1.

The communication system 1 of the firth example illustrated in FIG. 24 is substantially similar to the communication system 1 of the first example illustrated in FIG. 8 except for some differences. The differences include replacement of the distributed data processing terminal 6a with the distributed data processing terminal 6b having no verification data management database (DB) 6001, and replacement of the centralized data processing server 7a with the centralized data processing server 7b additionally having a feature value management DB 7001 in the storage unit 7000. The feature value management DB 7001, which is implemented by a feature value management table, is stored in the storage unit 7000. In this example, the elements that are substantially same to the elements described in the first example are assigned with the same reference numerals, and description thereof is omitted. The storage unit 7000 of the centralized data processing server 7b further stores feature values for verification.

(Feature Value Management Table)

FIG. 25 is a conceptual diagram illustrating an example of feature value management table. The feature value management table of FIG. 25 stores, for each one of one or more persons for management, feature value parameters for identifying an individual and a name of the individual in association. As described above, the feature value parameters may be generated based on various types of information that can be discriminative such as height or slope of facial components such as a nose or eyes detected in the facial image. In this example, the feature value management table of FIG. 25 may store information to be used for specifying or accessing the specific feature value parameters, such that data of the feature value parameters may be stored in any storage area in the storage unit 7000 or any other storage area accessible from the centralized data processing server 7b.

<<Operation>>

Figure 26:
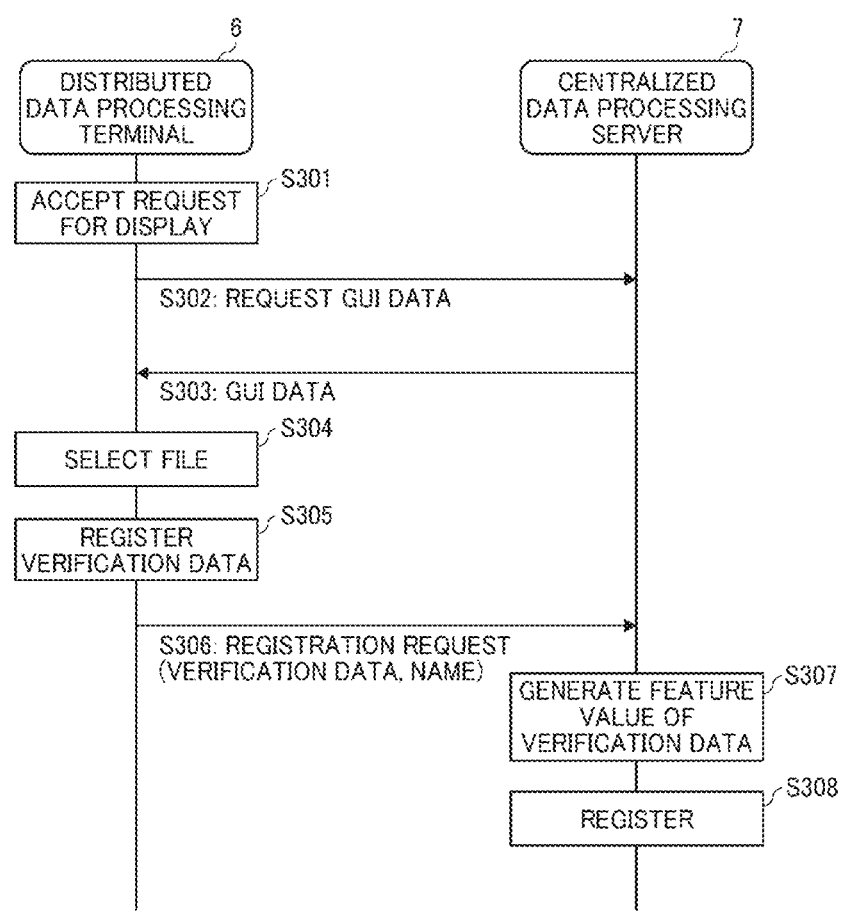
FIG. 26 is a sequence diagram illustrating a modified example of verification processing, described above referring to FIG. 15, according to the fifth example of the embodiment.
Figure 27:
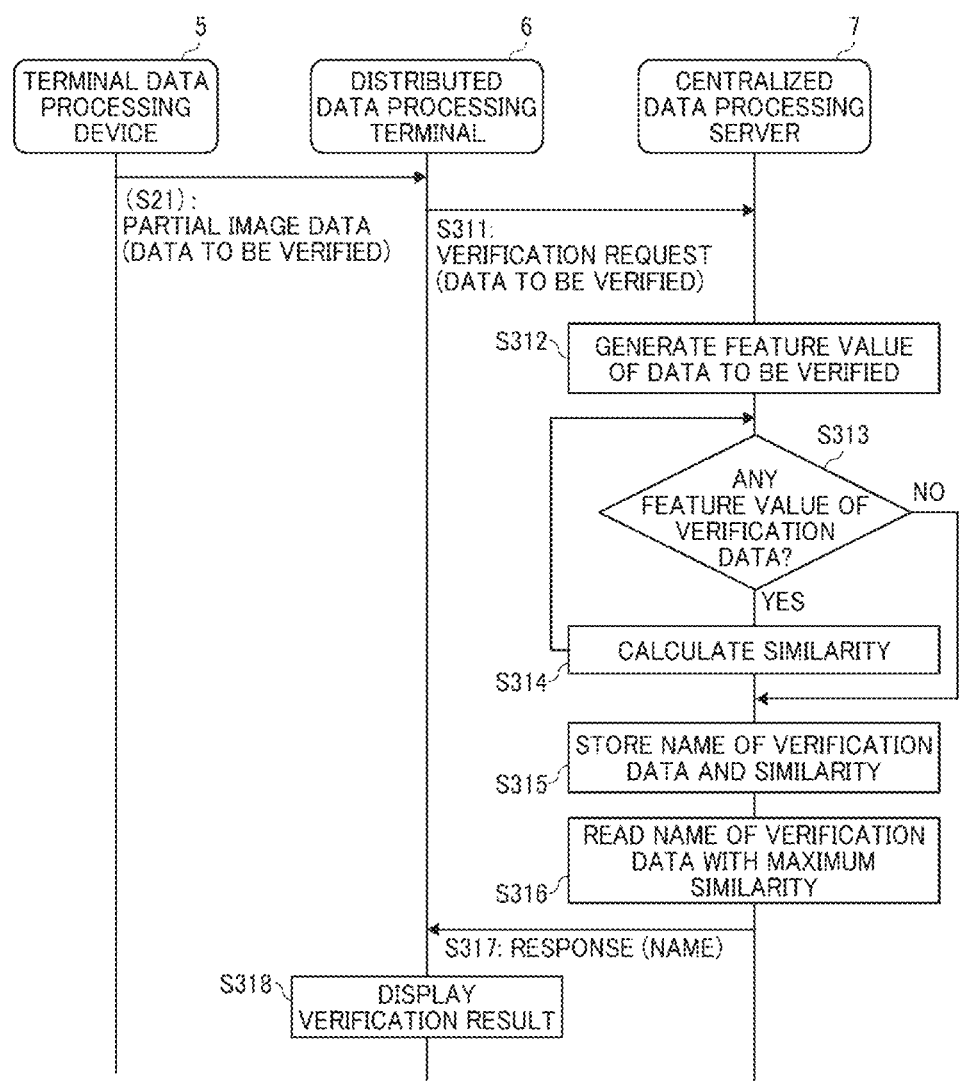
FIG. 27 is a sequence diagram illustrating a modified example of verification processing, described above referring to FIG. 15, according to the fifth example of the embodiment.

Referring to FIGS. 26 and 27, operation of capturing the image and displaying the image, performed by the communication system 1 having the functional configuration of FIG. 24, is described according to the fifth example. FIGS. 26 and 27 are sequence diagrams illustrating a modified example of verification processing, which is described above referring to FIG. 15 for the first example.

First, the acceptance unit 62 of the distributed data processing terminal 6b receives, from a user, an instruction to display the file selection screen as illustrated in FIG. 16A and the verification data registration screen as illustrated in FIG. 16B (S301). The transmitter and receiver 61 of the distributed data processing terminal 6b transmits GUI request information indicating a request for GUI data to the transmitter and receiver 71 of the centralized data processing server 7b (S302). The transmitter and receiver 71 of the centralized data processing server 7b receives the GUI request information.

Next, the transmitter and receiver 71 of the centralized data processing server 7b transmits the GUI data to the transmitter and receiver 61 of the distributed data processing terminal 6b. The GUI data is data read from the storage unit 7000 by the storing and reading unit 79. The GUI data is previously stored in the storage unit 7000. The transmitter and receiver 61 of the distributed data processing terminal 6b receives the GUI data.

The display control 67 of the distributed data processing terminal 6b causes the display 517 to display a file selection screen as illustrated in FIG. 16A, based on the GUI data that is received. S304 and S305 are performed in a substantially similar manner as described above referring to S111 and S112 in FIG. 15. The transmitter and receiver 61 transmits a registration request for registering the verification data to the transmitter and receiver 71 of the centralized data processing server 7b (S306). The registration request includes verification data of the image file selected at S304 and the name input at S305 for the registered image file.

Next, in the centralized data processing server 7b, the feature value generator 74 converts the data to be verified that is received at S306 into bitmap data, to generate feature value parameters for the data to be verified (S307). Such feature value parameters are used to identify an individual using various types of information that can be discriminative such as height or slope of facial components such as a nose or eyes detected in the face image. The storing and reading unit 79 stores, in the feature value management DB 7001, the feature value parameters generated at S307 and the name received at S306 in association with each other (S308).

Referring to FIG. 27, in the distributed data processing terminal 6b, when the transmitter and receiver 61 receives the partial image data as the data to be verified through the processing of S21, the transmitter and receiver 61 transmits the verification request to the centralized data processing server 7b (S311). The verification request includes the data to be verified. The centralized data processing server 7b receives the verification request at the transmitter and receiver 71.

Next, in the centralized data processing server 7b, the feature value generator 74 converts the data to be verified that is received at S311 into bitmap data, to generate feature value parameters for the data to be verified (S312). Such feature value parameters are used to identify an individual using various types of information that can be discriminative such as height or slope of facial components such as a nose or eyes detected in the facial image.

Then, the storing and reading unit 79 searches the feature value management DB 7001 to determine whether or not there is any feature value parameter for the registered verification data (S313). If it is determined at S313 that there is the feature value parameter of the registered verification data (S313: YES), the verification unit 75 compares the feature value parameters between the verification data and the data to be verified, and calculates the degree of similarity between these data (S314). The operation then returns to S313, to repeat the processing of S313 and S314 until similarity is calculated for the feature value parameters of all the registered verification data with respect to the data to be verified. On the other hand, if it is determined at S313 that there is no feature value parameter of the registered verification data (including the case where there is absolutely no parameter), the operation proceeds to S315.

Next, the storing and reading unit 79 temporarily stores, in the storage unit 7000, the "name" assigned to the verification data included in the registration request transmitted at S306 and the "similarity" calculated at S314 in association (S315).

Next, the storing and reading unit 79 reads out the "name" assigned to the verification data having the maximum similarity, which is selected from among the verification data each having the calculated similarity that is temporarily stored in the storage unit 7000 (S316). Then, the transmitter and receiver 71 transmits the response information indicating the response to the verification request received at S311 to the distributed data processing terminal 6b (S317). This response information includes the "name" of the verification data that is read out at S316.

Next, in the distributed data processing terminal 6b, the display control 67 causes the display 517 of the distributed data processing terminal 6b, to display a verification result message m3 as illustrated in FIG. 17, on the real-time captured image illustrated in FIG. 14A (S318). The verification result message m3 includes a "verification result" and a "name" assigned to the verification data having the maximum degree of similarity.

As described above, according to the present embodiment, since the verification data and the data to be verified are transmitted and received at different timings at S306 and S311, communication load is reduced compared to the example case of the first example described above.

Variation

Referring to FIGS. 28 to 41, a configuration of a communication system 1A, and operations to be performed by the communication system 1A, are described according to another embodiment. In this disclosure, the above-described embodiment including the first to fifth examples is referred to as a first embodiment, and the following embodiment is referred to as a second embodiment. In the second embodiment, the elements that are substantially same to the elements described in the first embodiment are assigned with the same reference numerals. For descriptive purposes, description thereof is omitted.

<<System Configuration>>

Figure 28:
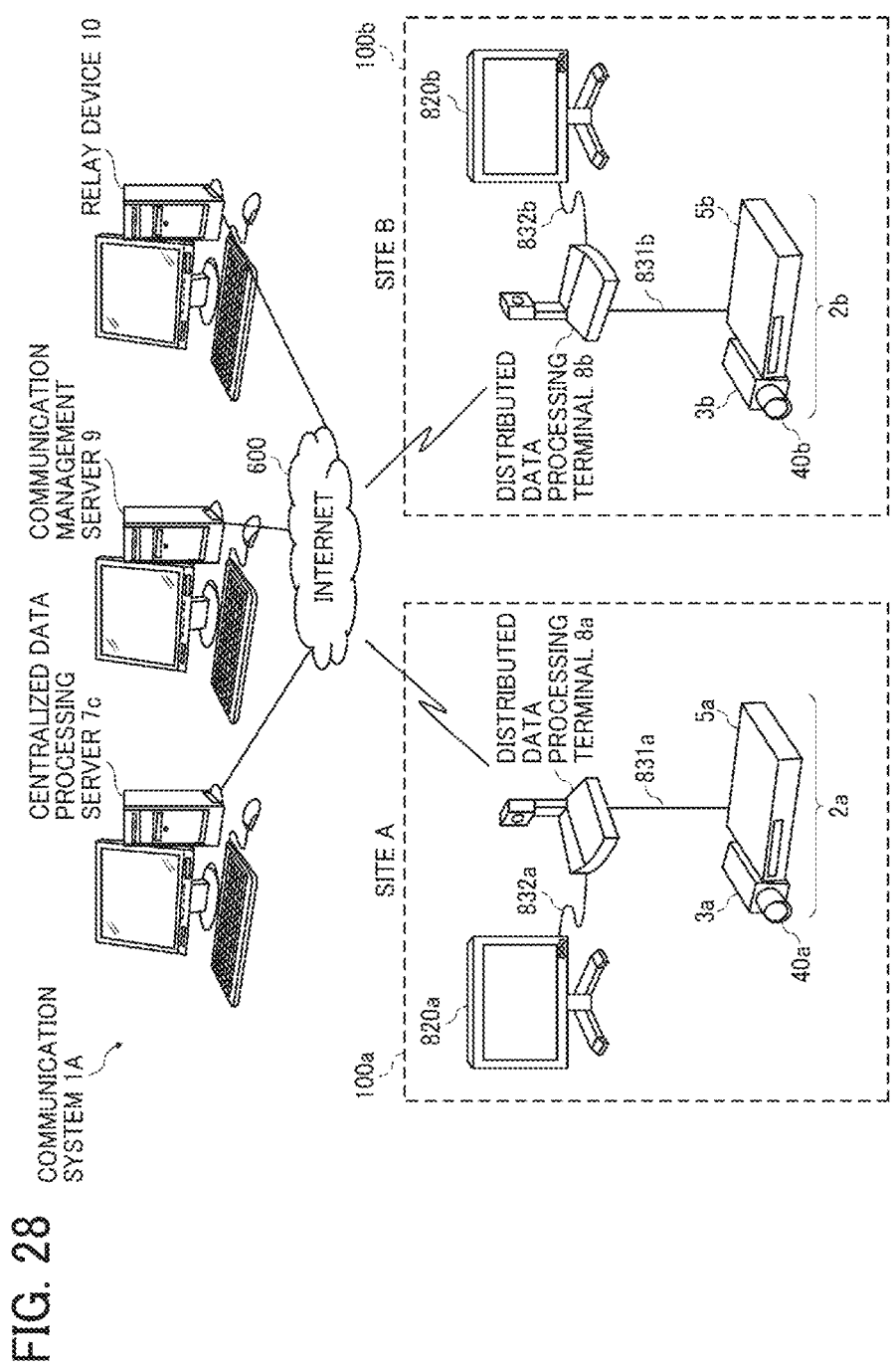
FIG. 28 is a schematic diagram illustrating a configuration of a communication system according to another embodiment.

FIG. 28 is a schematic diagram illustrating a configuration of the communication system 1A according to the second embodiment. Specifically, this embodiment describes a case in which the communication system of FIG. 1 is applied to a video conference system.

As illustrated in FIG. 28, the communication system 1A of this embodiment includes real-time data processing terminals 3a and 3b, terminal data processing devices 5a and 5b, distributed data processing terminal 8a and 8b, displays 820a and 820b, a centralized data processing server 7c, a communication management server 9, and a relay device 10, which are connected through the Internet 600.

The terminal data processing devices 5a and 5b are electrically connected with the distributed data processing terminals 8a and 8b, respectively, by Universal Serial Bus (USB) cables 831a and 831b. The distributed data processing terminals 8a and 8b are electrically connected with the displays 820a and 820b, respectively, by High Definition Multimedia Interface (HDMI) (Registered Trademark) cables 832a and 832b. Note that the USB cable and the HDMI cable are examples.

Further, the real-time data processing terminal 3a, the terminal data processing device 5a, the distributed data processing terminal 8a, and the display 820a together operate as a distributed processing system 100a. In this example, the distributed processing system 100a is disposed at a site A. Further, the real-time data processing terminal 3b, the terminal data processing device 5b, the distributed data processing terminal 8b, and the display 820b together operate as a distributed processing system 100b. In this example, the distributed processing system 100b is disposed at a site B. The real-time data processing terminal 3a and the terminal data processing device 5a are connected with each other so as to together function as an image acquisition terminal 2a. The real-time data processing terminal 3b and the terminal data processing device 5b are connected with each other so as to together function as an image acquisition terminal 2b.

Since the real-time data processing terminals 3a and 3b each have the same configuration as the real-time data processing terminal 3 described in the first embodiment, description thereof is omitted. Also, since the imaging units 40a and 40b have the same configuration as the imaging unit 40 described in the first embodiment, description thereof is omitted. Similarly, the terminal data processing devices 5a and 5b each have the same configuration as the terminal data processing device 5 described in the first embodiment, description thereof is omitted.

Further, since the distributed data processing terminals 8a and 8b each differ in configuration from the distributed data processing terminal 6 described in the first embodiment, they will be described later with reference to FIG. 29. In this disclosure, the distributed data processing terminal 8 is a generic term for the distributed data processing terminals 8a and 8b.

The communication management server 9, which may be implemented by one or more computers, centrally manages login authentication of the distributed data processing terminal 8, a communication state of the distributed data processing terminal 8, a contact list, and a communication state of the relay device 10. The image data may be a video image or a still image, or both of the video image and the still image.

The relay device 10, which may be implemented by one or more computers, relays content data between the plurality of distributed data processing terminals 8.

<<Hardware Configuration>>

<Hardware Configuration of Distributed Data Processing Terminal (Video Conference Terminal)>

Figure 29:
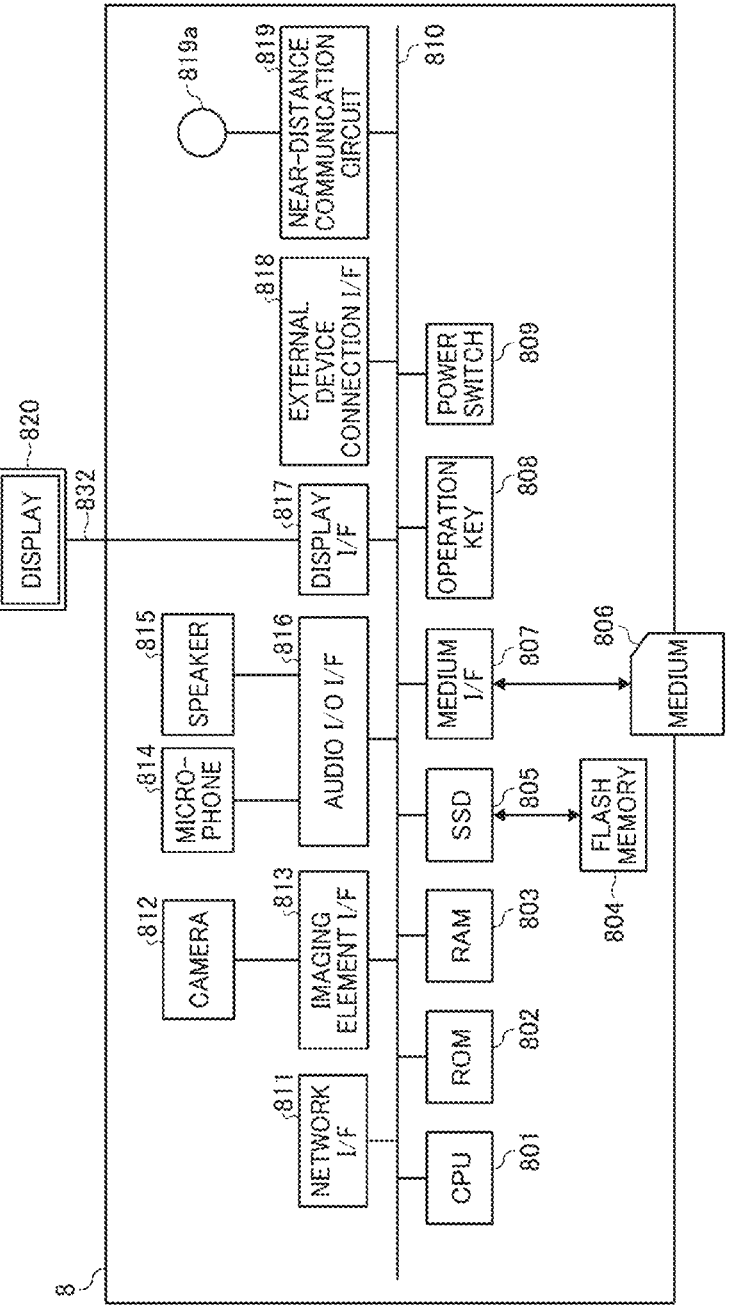
FIG. 29 is a schematic diagram illustrating a hardware configuration of a distributed data processing terminal, which is implemented as a video conference terminal, according to another embodiment.

FIG. 29 is a schematic diagram illustrating a hardware configuration of the distributed data processing terminal 8, which is implemented as a video conference terminal, according to the embodiment.

As illustrated in FIG. 29, the distributed data processing terminal 8 includes a CPU 801, a ROM 802, a RAM 803, a flash memory 804, a SSD 805, a medium I/F 807, an operation key 808, a power switch 809, a bus line 810, a network I/F 811, a camera 812, an imaging element 1/F 813, a microphone 814, a speaker 815, an audio input/output I/F 816, a display I/F 817, an external device connection I/F 818, a near-distance communication circuit 819, and an antenna 819a for the near-distance communication circuit 819.

The CPU 801 controls entire operation of the distributed data processing terminal 8. The ROM 802 stores a control program for controlling the CPU 101 such as an IPL. The RAM 803 is used as a work area for the CPU 801. The flash memory 804 stores various data such as a communication control program, image data, and audio data. The SSD 805 controls reading or writing of various data with respect to the flash memory 804 under control of the CPU 801. In alternative to the SSD, a hard disk drive (HDD) may be used. The medium I/F 807 controls reading or writing of data with respect to a recording medium 806 such as a flash memory. The operation key 808 is operated by a user to input a user instruction such as a user selection of a destination of the distributed data processing terminal 8. The power switch 809 turns on or off the power of the distributed data processing terminal 8.

The network I/F 811 is an interface that controls communication of data with an external device through the Internet 600. The camera 812 is an example of built-in imaging device capable of capturing a target under control of the CPU 801. The imaging element 1/F 813 is a circuit that controls driving of the camera 812. The microphone 814 is an example of built-in audio collecting device capable of inputting audio under control of the CPU 801. The audio I/O I/F 816 is a circuit for inputting or outputting an audio signal between the microphone 814 and the speaker 815 under control of the CPU 801. The display I/F 817 is a circuit for transmitting display data to the external display 820 under control of the CPU 801. The external device I/F 818 is an interface circuit that connects the distributed data processing terminal 8 to various external devices. The near-distance communication circuit 819 is a communication circuit that communicates in compliance with the near field radio communication (NFC) (Registered Trademark), the Bluetooth (Registered Trademark), and the like.

The bus line 810 may be an address bus or a data bus, which electrically connects various elements such as the CPU 801 of FIG. 29.

The display 820 may be a liquid crystal or organic electroluminescence (EL) display that displays an image of a subject, an operation icon, or the like. The display 820 is connected to the display I/F 817 by a cable 832. The cable 832 may be an analog red green blue (RGB) (video graphic array (VGA)) signal cable, a component video cable, a high-definition multimedia interface (HDMI) signal cable, or a digital video interactive (DVI) signal cable. Here, it is assumed that the cable 832 is the HDMI cable.

Note that the display 820 is a generic term for displays 820a and 820b to be described later. The HDMI cable 832 is a generic term for the HDMI cables 832a and 832b to be described later.

The camera 812 includes a lens and a solid-state imaging element that converts an image (video) of a subject to electronic data through photoelectric conversion. As the solid-state imaging element, for example, a complementary metal-oxide-semiconductor (CMOS) or a charge-coupled device (CCD) is used. The external device connection I/F 818 is capable of connecting an external device such as an external camera, an external microphone, or an external speaker through a USB cable or the like. In the case where an external camera is connected, the external camera is driven in preference to the built-in camera 812 under control of the CPU 801. Similarly, in the case where an external microphone is connected or an external speaker is connected, the external microphone or the external speaker is driven in preference to the built-in microphone 814 or the built-in speaker 815 under control of the CPU 801.

The recording medium 806 is removable from the distributed data processing terminal 8. Any non-volatile memory such as an electrically erasable and programmable read-only memory (EEPROM) may be used instead of the flash memory 804, as long as the memory reads or writes data under control of the CPU 801.

Since the communication management server 9 and the relay device 10 in FIG. 28 is substantially similar in hardware configuration to the centralized data processing server 7 in FIG. 6, description thereof is omitted.

<<Functional Configuration>>

Figure 30:
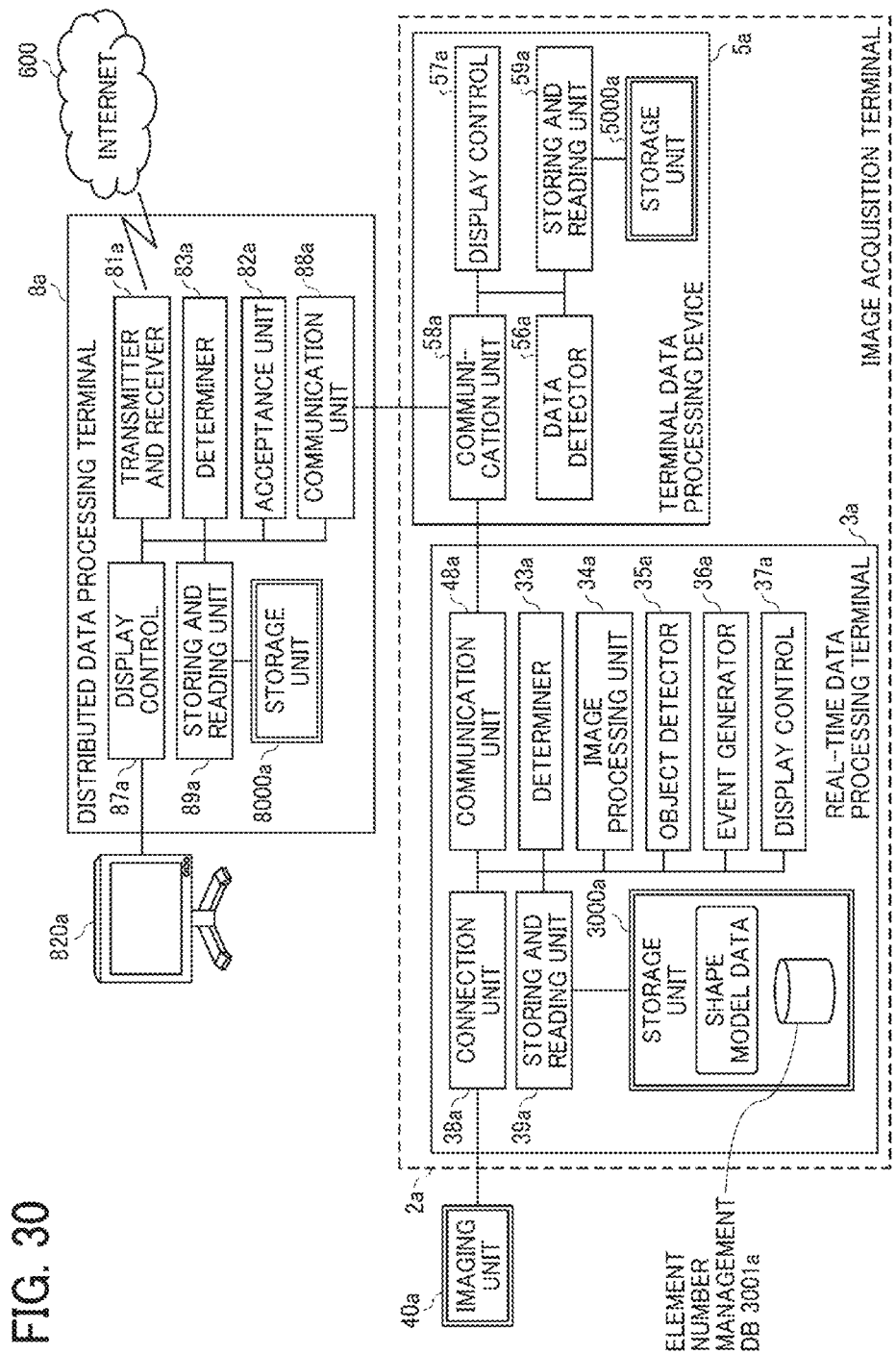
FIG. 30 is a schematic block diagram illustrating a functional configuration of a distributed processing system in the communication system of FIG. 28 according to another embodiment.
Figure 31:
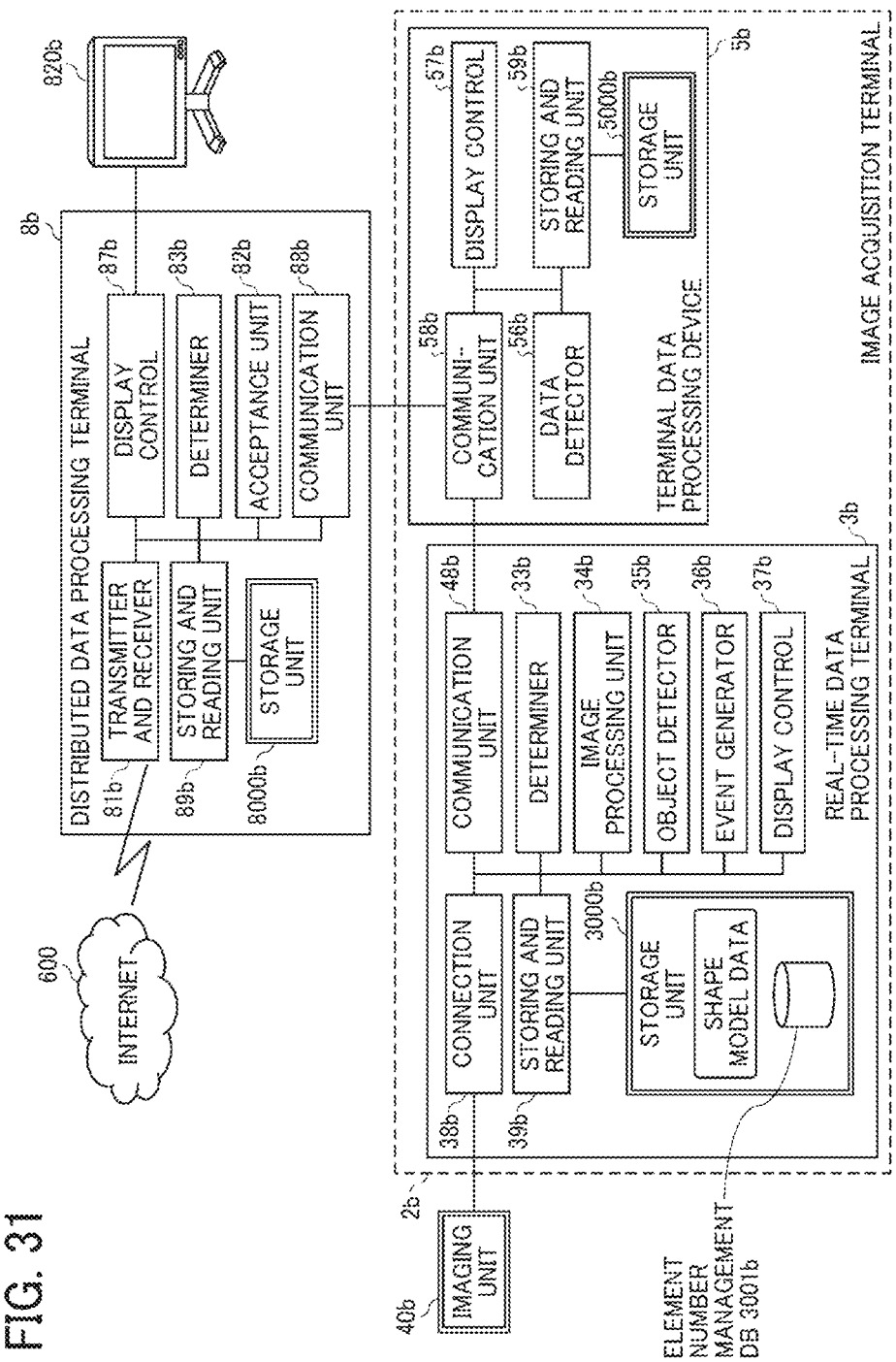
FIG. 31 is a schematic block diagram illustrating a functional configuration of a distributed processing system in the communication system of FIG. 28 according to another embodiment.
Figure 32:
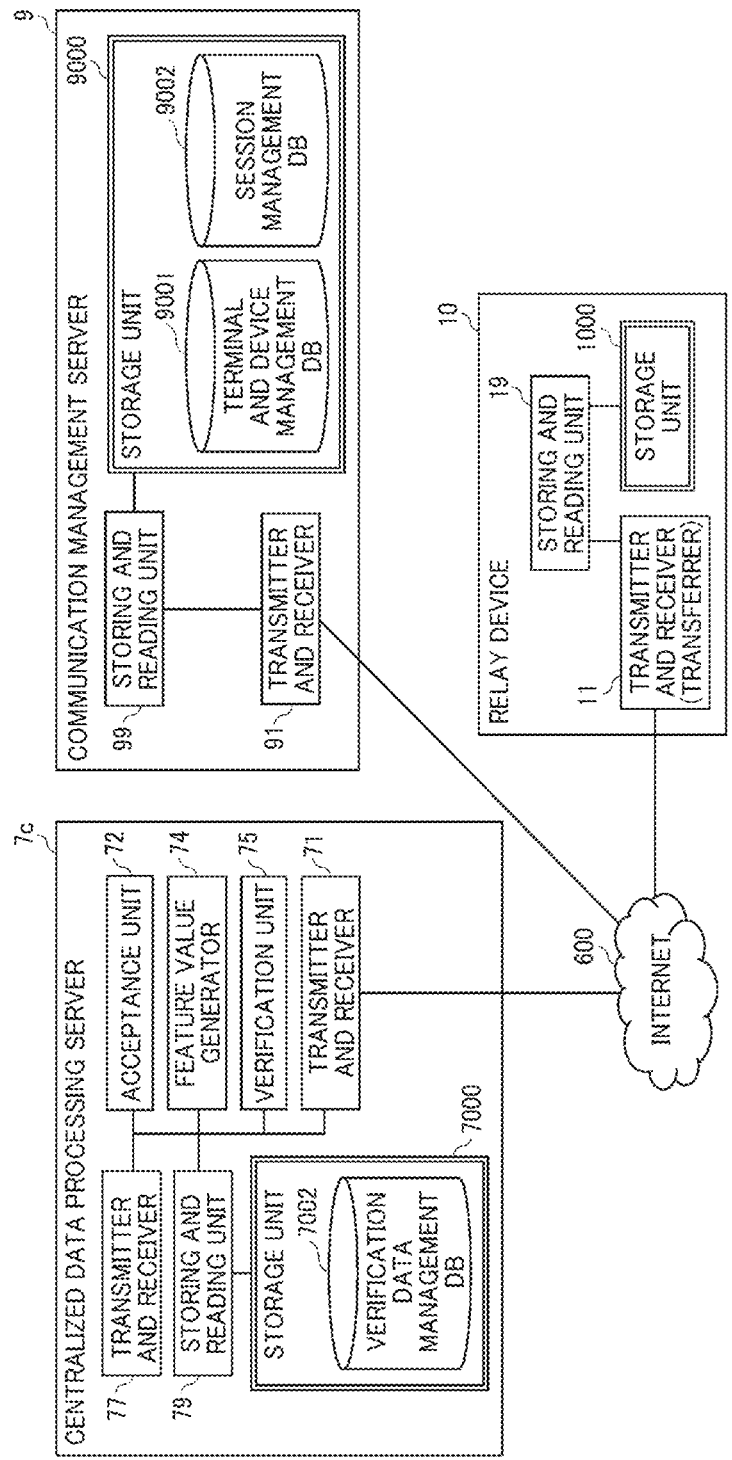
FIG. 32 is a schematic block diagram illustrating a functional configuration of a centralized data processing server, a communication management server, and a relay device, in the communication system of FIG. 28, according to another embodiment.

Referring now to FIGS. 30 to 32, a functional configuration of the communication system 1A is described according to the embodiment. FIG. 30 is a schematic block diagram illustrating a functional configuration of the distributed processing system 100a according to the second embodiment. FIG. 31 is a schematic block diagram illustrating a functional configuration of the distributed processing system 100b according to the second embodiment. FIG. 32 is a schematic block diagram illustrating a functional configuration of the centralized data processing server 7c, the communication management server 9, and the relay device 10 according to the second embodiment.

<Functional Configuration of Distributed Processing System 100a>

Referring to FIG. 30, the real-time data processing terminal 3a of the image acquisition terminal 2a includes a determiner 33a, an image processing unit 34a, an object detector 35a, an event generator 36a, a display control 37a, a connection unit 38a, a storing and reading unit 39a, and a communication unit 48a. The real-time data processing terminal 3 further includes a storage unit 3000a. The storage unit 3000a further includes an imaging element number management DB 3001a, in addition to the shape model data.

Since these functional units correspond to the determiner 33, the image processing unit 34, the object detector 35, the event generator 36, the display control 37, the connection unit 38, the storing and reading unit 39, the communication unit 48, respectively, description thereof is omitted. Further, the storage unit 3000a is similar in function to the storage unit 3000 described above. The imaging element number management DB 3001a is implemented by an imaging element number management table. Since this imaging element number management table is similar to the one stored in the imaging element number management DB 3001, description thereof is omitted.

The terminal data processing device 5a of the image acquisition terminal 2a includes a data detector 56a, a display control 57a, a communication unit 58a, and a storing and reading unit 59a. The terminal data processing device 5 further includes a storage unit 5000a. Since these functional units correspond to the data detector 56, the display control 57, the communication unit 58, and the storing and reading unit 59, respectively, description thereof is omitted. Further, the storage unit 5000a is similar in function to the storage unit 5000 described above. In this example, the communication unit 58a is able to communicate with the communication unit 48a of the real-time data processing terminal 3a and a communication unit 88a of the distributed data processing terminal 8a.

The distributed data processing terminal 8a includes a transmitter and receiver 81a, an acceptance unit 82a, a determiner 83a, a display control 87a, the communication unit 88a, and a storing and reading unit 89a. The distributed data processing terminal 8a further includes a storage unit 8000a.

The transmitter and receiver 81a, which is implemented by the network I/F 811 and the instructions of the CPU 801, is similar in function to the transmitter and receiver 61.

The acceptance unit 82a, which is implemented by the operation key 808, the power switch 809, and the instructions of the CPU 801, is similar in function to the acceptance unit 62.

The determiner 83a, which is implemented by instructions of the CPU 801, performs various determinations.

The display control 87a, which is implemented by the instructions of the CPU 801, controls the display 820a to display various screens.

The communication unit 88a, which is implemented by the external device connection I/F 818, is able to communicate with the communication unit 58a of terminal data processing device 5a via a USB cable 831a.

The storing and reading unit 89a, which is implemented by the instructions of the CPU 801, stores various data or information in the storage unit 8000a or reads out various data or information from the storage unit 8000a. Since the storage unit 8000a is similar in function to the storage unit 6000, description thereof is omitted.

<Functional Configuration of Distributed Processing System 100b>

As illustrated in FIG. 31, the real-time data processing terminal 3b, the terminal data processing device 5b, and the distributed data processing terminal 8b in the distributed processing system 100b are similar in function to the real-time data processing terminal 3a, the terminal data processing device 5a, and the distributed data processing terminal 8a in the distributed processing system 100a, respectively, except that the reference numeral is added with the letter "b". Accordingly, description thereof is omitted.

FIG. 32 is a schematic block diagram illustrating a functional configuration of the centralized data processing server 7c, the communication management server 9, and the relay device 10, in the communication system 1A according to the second embodiment.

<Functional Configuration of Centralized Data Processing Server 7c>

The centralized data processing server 7c illustrated in FIG. 32 is similar in function to the centralized data processing server 7a of the first example of the first embodiment described referring to FIG. 8, such that description thereof is omitted. In the centralized data processing server 7c according to this embodiment, the storage unit 7000 stores verification data management DB 7002. Since the verification data management DB 7002 stores the verification data management table (see FIG. 9B), which is similar to the one stored in the verification data management DB 8001 of the first embodiment, description thereof is omitted <Functional Configuration of Communication Management Server 9>

As illustrated in FIG. 32, the communication management server 9 includes a transmitter and receiver 91 and a storing and reading unit 99. These units are functions that are implemented by or that are caused to function by operating any of the elements illustrated in FIG. 6 in cooperation with the instructions of the CPU 701 according to the control program expanded from the HD 704 to the RAM 703.

The communication management server 9 further includes a storage unit 9000, which is implemented by the ROM 702, the RAM 703 and the HD 704 illustrated in FIG. 6. The storage unit 9000 stores therein a terminal and device management DB 9001 and a session management DB 9002. The terminal and device management DB 9001 is implemented by a terminal and device management table, which is described below. The session management DB 9002 is implemented by a session management table, which is described below.

(Terminal and Device Management Table)

FIG. 33A is a conceptual diagram illustrating the terminal and device management table, according to the embodiment. The terminal and device management table stores, for each distributed data processing terminal 8 or relay device 10, a terminal ID or a device ID, a name of the terminal or device, and an IP address of the terminal or device, in association.

(Session Management Table)

FIG. 33B is a conceptual diagram illustrating the session management table, according to the embodiment. The session management table stores, for each session to be used for communication, a session ID for identifying the session, a relay device ID of the relay device 10 to be used in relaying image data and audio data in the session, the terminal ID of a starting terminal that starts communication, and the terminal ID of a counterpart terminal in association. For example, the starting terminal is the distributed data processing terminal 8a, and the counterpart terminal is the distributed data processing terminal 8b.

(Functional Configuration of Communication Management Server)

Next, referring to FIG. 32, a functional configuration of the communication management server 9 is described in detail.

The transmitter and receiver 91 of the communication management server 9, which is implemented by the network I/F 709 and the instructions of the CPU 701, transmits or receives various data (or information) to or from other server, apparatus, terminal, or device via a communication network (the Internet 600).

The storing and reading unit 99, which is implemented by the instructions of the CPU 701, stores various data or information in the storage unit 9000 or reads out various data or information from the storage unit 9000.

<Functional Configuration of Relay Device 10>

As illustrated in FIG. 32, the relay device 10 includes a transmitter and receiver (transferrer) 11 and a storing and reading unit 19. These units are functions that are implemented by or that are caused to function by operating any of the elements illustrated in FIG. 6 in cooperation with the instructions of the CPU 701 according to the control program expanded from the HD 704 to the RAM 703. The relay device 10 also includes a storage unit 1000, which may be implemented by the ROM 702, RAM 703, and HD 704 illustrated in FIG. 6.

(Functional Configuration of Relay Device)

Referring to FIG. 32, a functional configuration of the relay device 10 is described in detail.

The transmitter and receiver 11 of the relay device 10, which is implemented by the network I/F 709 and the instructions of the CPU 701, transmits or receives various data (or information) to or from other server, apparatus, terminal, or device via a communication network (the Internet 600).

The storing and reading unit 19, which is implemented by the instructions of the CPU 701, stores various data or information in the storage unit 1000 or reads out various data or information from the storage unit 1000.

<<Operation>>

Referring to FIGS. 34 to 41, operation of capturing the image and displaying the image, performed by the communication system 1A, is described according to the embodiment. The following describes an example case in which, after the distributed data processing terminal 8a requests another distributed data processing terminal 8c to start communication via the communication management server 9, the distributed data processing terminals 8a and 8b and the third distributed data processing terminal 8c start communicating with one another via the relay device 10.

Figure 35:
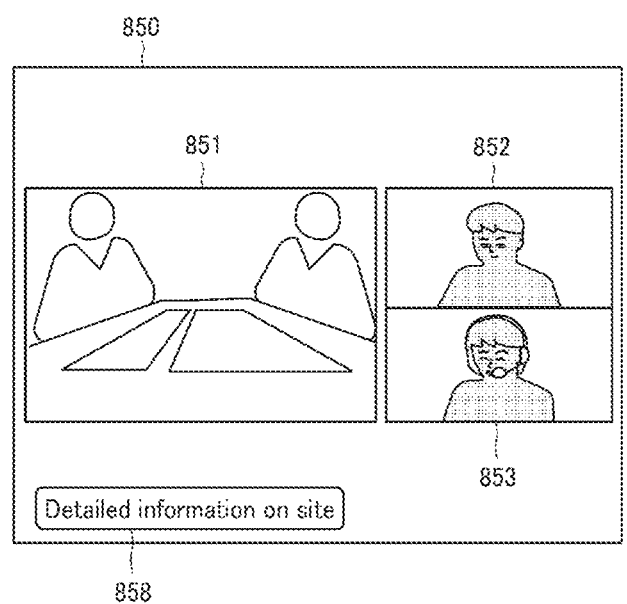
FIG. 35 is an illustration of an example video conference screen, displayed at the distributed data processing terminal during communication.
Figure 36:
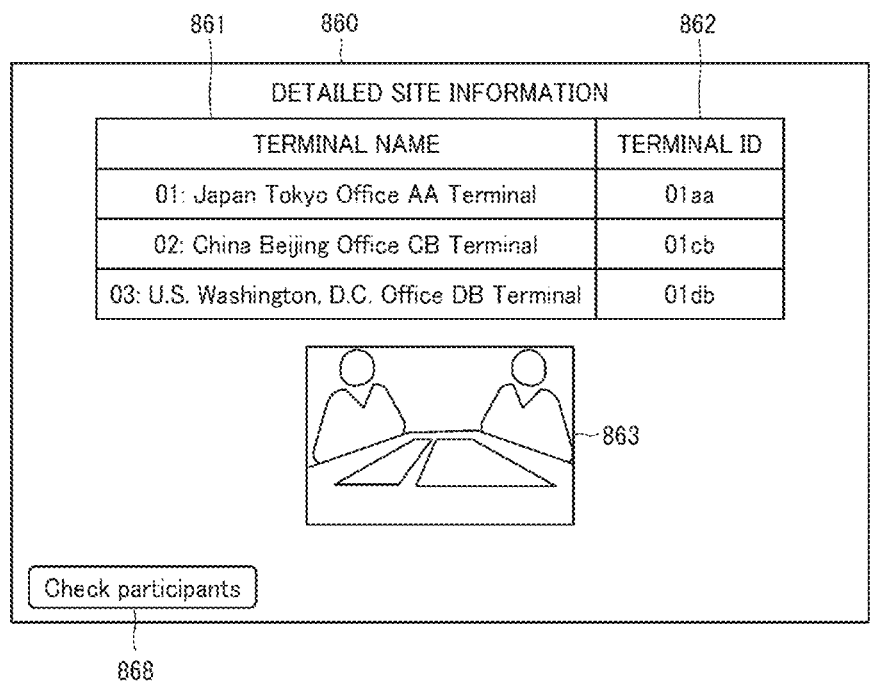
FIG. 36 is an illustration of an example detailed site screen for providing detailed information on each site, which is displayed at the distributed data processing terminal.

FIG. 34 is a sequence diagram illustrating operation of processing an image recognition start request, performed by the communication system 1A, according to the second embodiment. FIG. 35 is an illustration of an example video conference screen, displayed at the distributed data processing terminal 8a during communication. FIG. 36 is an illustration of an example detailed site screen for providing detailed information on each site, which is displayed at the distributed data processing terminal 8a, before displaying a name of the participant in the videoconference.

During the videoconference being performed between three sites, the display control 87a of the distributed data processing terminal 8a causes the display 820a to display a videoconference screen 850 as illustrated in FIG. 35 (S401).

The video conference screen 850 includes a main display area 851, and two sub display areas 852 and 853. The main display area 851 displays therein an image of a site at which a participant who is currently speaking resides. The sub display area 852 displays an image of a local site (in this case, an image of a user operating the distributed data processing terminal 8a). The sub display area 853 displays an image of a site at which a participant who is not currently speaking resides.

If any participant whose image is displayed in the sub display area 853 starts speaking, the display control 87a switches between the image of the site being currently displayed in the main display area 851, and the image of the site being displayed in the sub display area 853, such that the main display area 851 displays the image of a participant who is currently speaking.

The video conference screen 850 further includes a "Detailed information on site" button 858, at the lower left. The "Detailed information on site" button 858, when pressed by the user, causes the display 820a to switch displaying a detailed site screen 860 illustrated in FIG. 36.

Next, in response to pressing of the "Detailed information on site" button 858 by the user, the acceptance unit 82a accepts an instruction to display the detailed site screen (S402). The display control 87a controls the display 820a to display the detailed site screen 860 illustrated in FIG. 36. The detailed site screen 860 includes, for each one of all sites that are currently participating in the same communication session as the distributed data processing terminal 8a, a display field 861 for displaying the terminal name of the terminal at the site, and a display field 862 for displaying the terminal ID of the terminal at the site.

Figure 41:
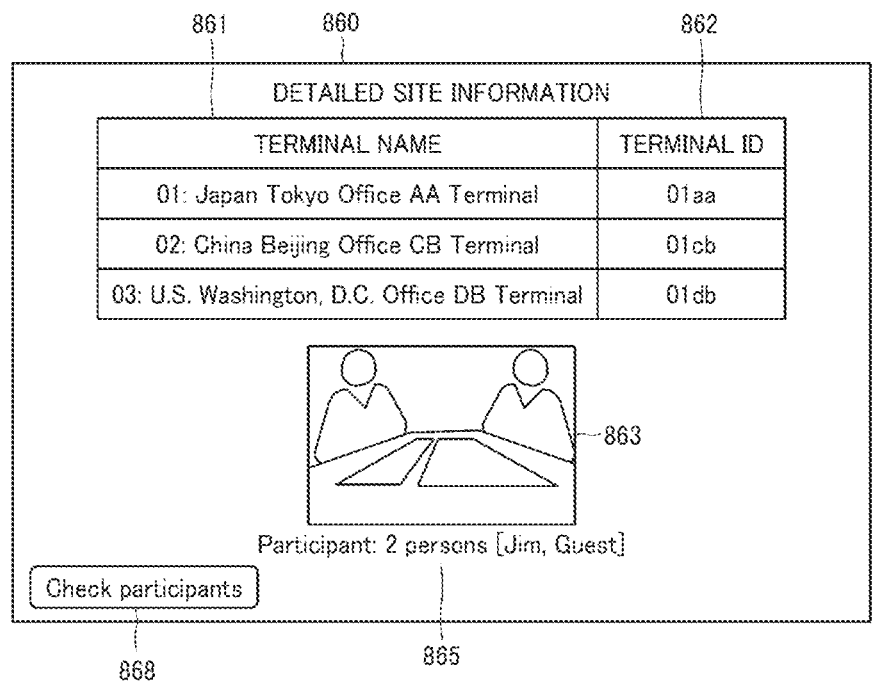
FIG. 41 is an illustration of an example detailed site screen for providing detailed information on each site, which is displayed at the distributed data processing terminal, after displaying a name of the participant in the videoconference.

The detailed site screen 860 includes, in its central section, a speaking site display area 863 for displaying display contents (that is, the image) of the main display area 851 in a reduced size. The detailed site screen 860 further includes a "Check participants" button 868 at the lower left. The "Check participants" button 868, when pressed by the user, additionally displays a participant information display area 865 as illustrated in FIG. 41, with a number of participants and a name of each participant.

In response to pressing of the "Check participants" button 868 by the user, the acceptance unit 82a receives an instruction for starting processing to recognize each participant in the video conference (S404).

Next, the transmitter and receiver 81a of the distributed data processing terminal 8a transmits, to the communication management server 9, recognition request information indicating a request for recognizing each participant of the other site being displayed in the main display area 851 (S405). This recognition request information (recognition request) includes a terminal ID for identifying the distributed data processing terminal 8 of the other site being displayed in the main display area 851. The transmitter and receiver 91 of the communication management server 9 receives the recognition request information.

Next, the storing and reading unit 99 of the communication management server 9 searches the terminal and device management DB 9001 using the terminal ID received at S405 as a search key, to obtain the IP address of the distributed data processing terminal 8 of the other site (S406). The transmitter and receiver 91 transmits image verification start request information (image verification start request) indicating a request to start image verification to the distributed data processing terminal 8b identified with the read IP address (S407). The transmitter and receiver 81b of the distributed data processing terminal 8b receives the image verification start request.

The communication unit 88b of the distributed data processing terminal 8b transmits a request to start image verification to the terminal data processing device 5b (S408). The communication unit 58b of the terminal data processing device 5b receives the image verification start request. The communication unit 58b of the terminal data processing device 5b transmits the image verification start request to the real-time data processing terminal 3b (S409). The communication unit 48b of the real-time data processing terminal 3b receives the image verification start request. S407 to S409 of FIG. 34 are performed in a substantially similar manner as described above referring to S1-2 to S3-2 of FIG. 22.

Figure 37:
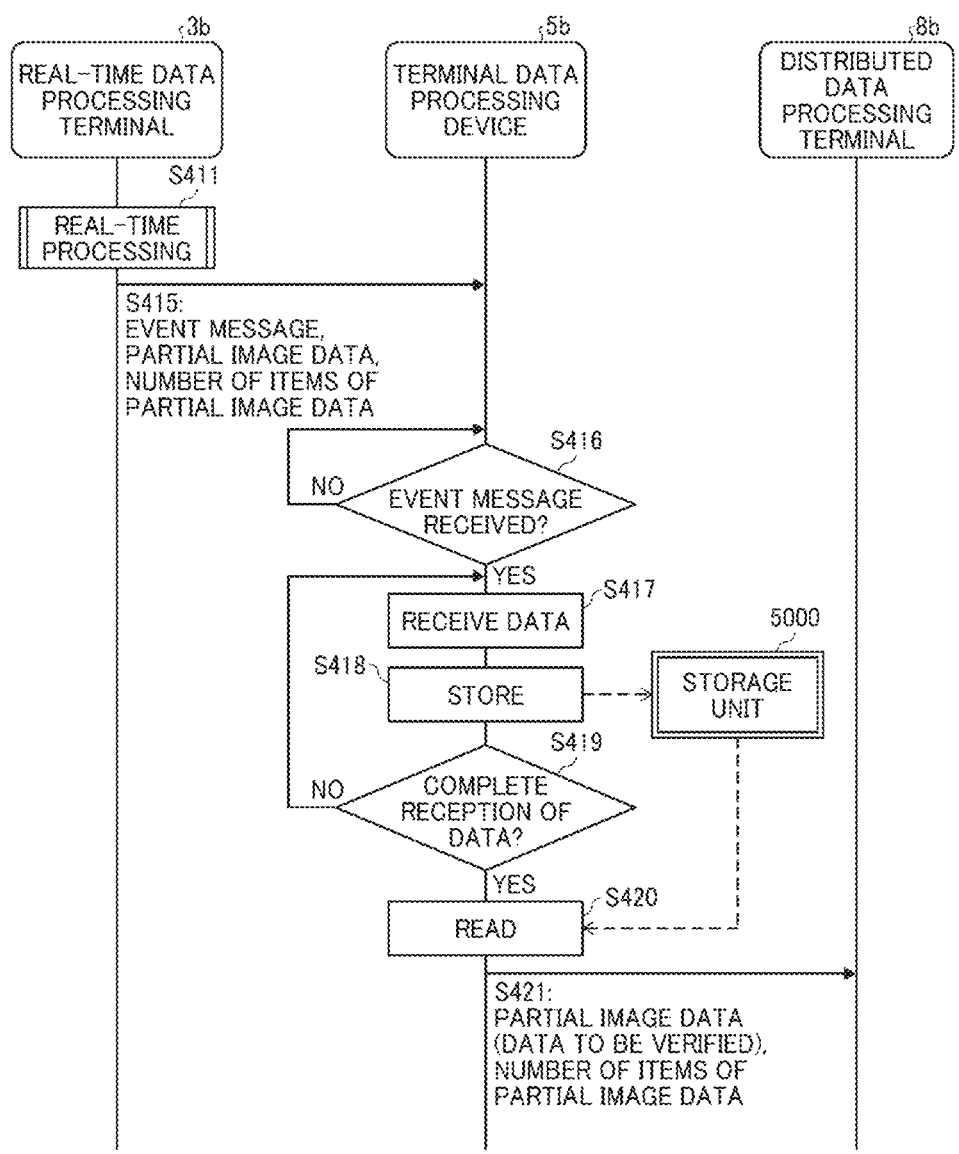
FIG. 37 is a sequence diagram illustrating an example of image recognition processing, performed by the communication system of FIG. 28, according to another embodiment.

Next, referring to FIG. 37, image recognition processing is described according to the second embodiment. FIG. 37 is a sequence diagram illustrating an example of image recognition processing, performed by the communication system 1A, according to the second embodiment. The processing of FIG. 37 differs from the image recognition processing of the first example illustrated in FIG. 11 in that S12 and S13 of transmitting partial image data are omitted, and processing to transmit or receive information indicating a number of items of partial image data is added.

Figure 38:
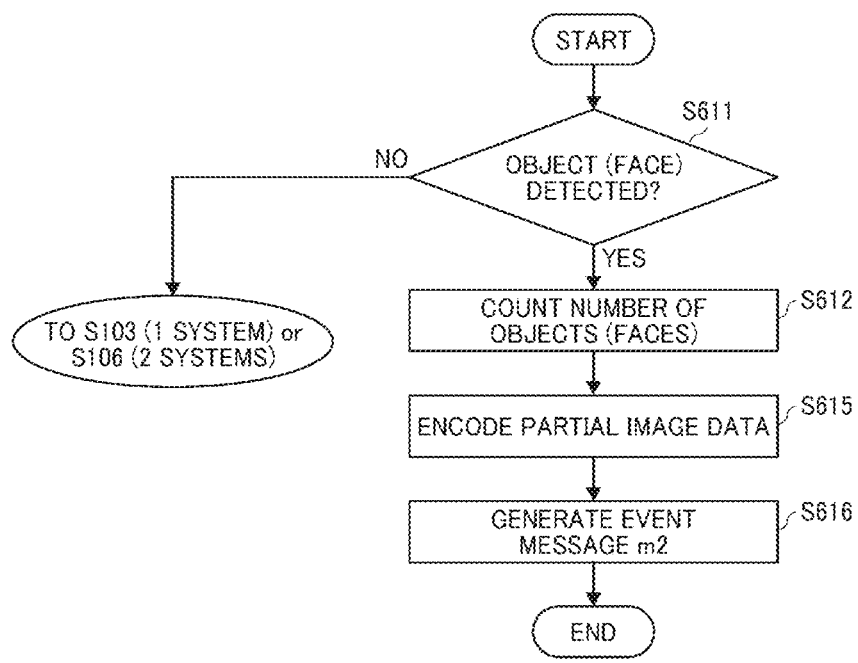
FIG. 38 is a flowchart illustrating an example of event generation processing, performed in the real-time processing, according to another embodiment.

The real-time data processing terminal 3b performs real-time processing (S411). In the following, real-time processing is described with reference to FIG. 38. Since the processing to detect an object is the same as that of the first example illustrated in FIG. 12, description thereof is omitted. FIG. 38 is a flowchart illustrating an example of event generation processing, performed in the real-time processing, according to the second embodiment. The event generation processing of FIG. 38 is a variation of the event generation processing of FIG. 13.

As illustrated in FIG. 38, when the object detector 35b does not detect an object (in this case, a human face) at S104 (S611: NO), the operation returns to S103 in case of the imaging unit 40 with one imaging system, and to S106 in case of the imaging unit 40 with two imaging systems. On the other hand, when the object detector 35b detects an object (in this case, a human face) at S104 (S611: YES), the operation proceeds to S612. The object detector 35b counts a number of objects that are detected (in this case, human faces) (S612).

Next, the object detector 35b encodes the partial image data, which is a part of the captured image that includes the detected human face, in a general-purpose format such as JPEG (S615). The event generator 36b ​​ generates an event message notifying that the partial image data is transmitted to the terminal data processing device 5b (S616). Specifically, the event generator 36b ​​ generates the event message m2 such as "Send".

The real-time processing of S411 illustrated in FIG. 37 then ends. The communication unit 48b transmits the event message m2 generated at S616, the partial image data detected at S104, and information on the number of items of partial image data (that is, the number of detected objects) counted at S612, to the communication unit 58b of the terminal data processing device 5b (S415).

When a plurality of objects (in this case, human faces) are detected at S104, at 5415, a plurality of items of partial image data and information on the number of items of partial image data are transmitted together with one event message m2.

The terminal data processing device 5b performs S416 to S421 in a substantially similar manner as described above referring to S16 to S21 of FIG. 11 in the first example of the first embodiment. At S21 in the first example, the transmitter and receiver 51 of the terminal data processing device 5 transmits the partial image data as the data to be verified to the transmitter and receiver 61 of the distributed data processing terminal 6a. At S421 in the second embodiment, the communication unit 58b of the terminal data processing device 5b transmits, to the communication unit 88b of the distributed data processing terminal 8b, the partial image data as the data to be verified, and information on the number of items of partial image data. The information on the number of items of partial image data, which is transmitted, has been received at S415.

Figure 39:
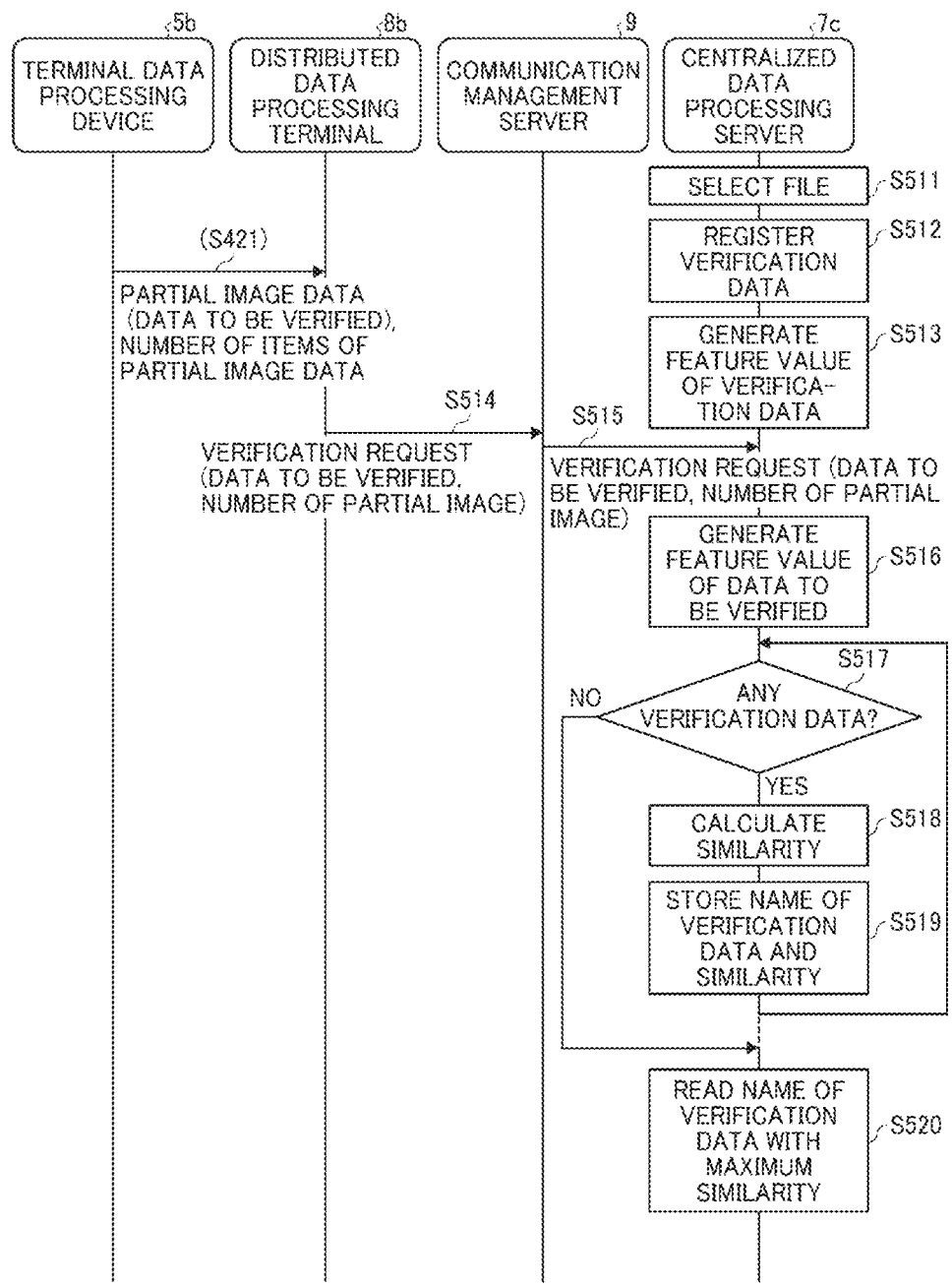
FIG. 39 is a sequence diagram illustrating an example of verification processing, according to another embodiment.
Figure 40:
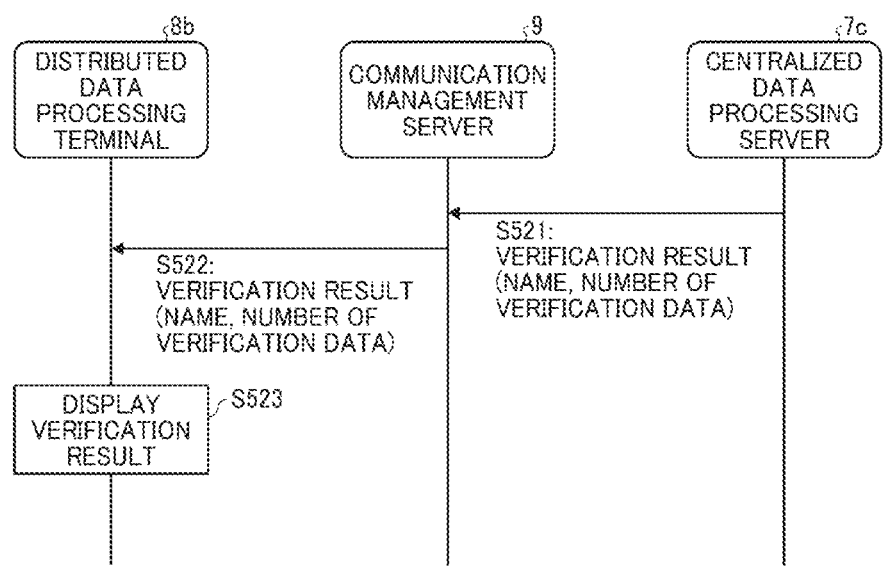
FIG. 40 is a sequence diagram illustrating processing of displaying the verification result, according to another embodiment.

Next, with reference to FIGS. 39 to 41, verification processing of verifying data to be verified, i.e., the partial image data, using the registered verification data is described, according to the second embodiment. FIG. 39 is a sequence diagram illustrating processing of verifying the data to be verified, according to the second embodiment. FIG. 40 is a sequence diagram illustrating processing of displaying the verification result, according to the second embodiment. FIG. 41 is an illustration of an example detailed site screen for providing detailed information on each site, which is displayed at the distributed data processing terminal 8a, after displaying a name of the participant in the videoconference.

Note that the verification processing of FIG. 39 and the displaying processing of FIG. 40 according to the second embodiment is a variation of the processing of FIG. 15 according to the first example of the first embodiment. The processing performed at the distributed data processing terminal 6 in the first example of the first embodiment is basically performed by the centralized data processing server 7 in the second embodiment. That is, the centralized data processing server 7 stores therein verification data to be used for image verification.

To register the verification data, the administrator operates the centralized data processing server 7 to cause the display control 77 to display the file selection screen as illustrated in FIG. 16A for selection of verification data to be registered. When the administrator selects an image to be registered (in this case, a facial image) after pressing the "Select file" button b11, the acceptance unit 72 accepts the selection of the image file to be registered (S511).

Similarly to the example case illustrated in FIG. 16B, the display control 77 controls the display 517 to display the registration screen for registering the verification data that is selected. After confirming that the selected image file a21 is the desired image, the administrator enters a name of the image to be registered as verification data in the name entry field a22, and then presses the "Register" button b21. In response to pressing of the "Register" button b21, the acceptance unit 72 registers the image as the verification data (S512). Specifically, the storing and reading unit 79 stores, in the verification data management DB 6001, the file name a21 and the name entered in the name entry field a22 in association with each other.

When the selected image file a21 is not the desired image file, the administrator presses the "Cancel" button b22 to cause the display 517 to display the file selection screen similarly to the example case illustrated in FIG. 16A.

Next, in the centralized data processing server 7c, the feature value generator 74 converts the verification data that is registered at S512 into bitmap data, to generate feature value parameters for the verification data (S513). Such feature value parameters are used to identify an individual using various types of information that can be discriminative such as height or slope of facial components such as a nose or eyes detected in the facial image.

As described above, the verification data is registered directly to the centralized data processing server 7c, rather than registering to the terminal data processing device 5b. This sufficiently reduces the load on communication network, caused due to communication between the terminal data processing device 5b and the centralized data processing server 7.

Next, as the communicating unit 88b of the distributed data processing terminal 8b receives the partial image data as data to be verified, and information on the number of images of partial image data at S421, the transmitter and receiver 81b transmits, to the communication management server 9, verification request information indicating a verification request (S514). The verification request information includes the data to be verified, and information on the number of items of data to be verified. The transmitter and receiver 91 of the communication management server 9 receives the verification request information.

Next, the transmitter and receiver 91 transmits (transfers) the verification request information that is received at S514, to the centralized data processing server 7c (S515). The centralized data processing server 7c receives the verification request information at the transmitter and receiver 71.

Next, the feature value generator 74 decodes the data to be verified, which is received at S515, into bitmap data, and calculates parameters of feature values for the data to be verified (S516). Such feature value parameters are used to identify an individual using various types of information that can be discriminative such as height or slope of facial components such as a nose or eyes detected in the facial image.

Then, the storing and reading unit 79 searches the feature value management DB 7001 to determine whether or not there is any registered verification data (S517). If it is determined at S517 that there is the registered verification data (S517: YES), the verification unit 75 compares the feature value parameters between the verification data and the data to be verified, and calculates the degree of similarity between these data (S518).

Next, the storing and reading unit 79 temporarily stores, in the storage unit 7000, the "name" assigned to the verification data registered at S512 and the "similarity" calculated at S518 in association (S519). The above-described processing from S517 is performed on verification data listed next in the verification data management table in FIG. 9B, until all items of verification data that has been registered is processed.

On the other hand, when it is determined at S517 that there is no verification data being registered (including cases where there is absolutely no verification data), the operation proceeds to S520.

The storing and reading unit 79 obtains the verification data having the degree of similarity that is equal to or greater than a threshold, from all items of verification data temporarily stored in the storage unit 7000. The storing and reading unit 79 then reads the "name" assigned to the verification data having the maximum degree of similarity, which is specified from among the verification data having the similarly that is equal to or greater than the threshold (S520). The threshold is set to, for example, "80%". Accordingly, when the similarity is low, for example, lower than the threshold, the "name" of such verification data is not read out.

The processing of S516 to S520 is repeated for the number of items of data to be verified. That is, if two persons are detected at one site, the processing of S516 to S520 is repeated twice.

Referring to FIG. 40, the transmitter and receiver 71 of the centralized data processing server 7c transmits, to the communication management server 9, verification result information indicating the verification result (S521). The verification result information includes the name of the verification data that is read at S520, and the information on the number of items of verification data that is received at S515. The transmitter and receiver 91 of the communication management server 9 receives the verification result information.

Next, the transmitter and receiver 91 of the communication management server 9 transmits (transfers) the verification result information that is received at 5S21, to the distributed data processing terminal 8b (S522). The transmitter and receiver 81b of the distributed data processing terminal 8b receives the verification result information.

Next, as illustrated in FIG. 41, the display control 87b of the distributed data processing terminal 8b controls the display 820b to display the verification result in the participant information display field 865. The verification result in this example includes a number of participants and a name of each participant. The number of participants is expressed based on the number of items of verification data included in the verification result information received at S522. In addition, the participant name is expressed based on the participant name also included in the verification result information.

In FIG. 41, the name (Jim) is displayed for the participant whose facial image (partial image data) has a degree of similarity equal to or greater than the threshold, with respect to the registered verification data, as a result of the above-described processing of S520. If the participant whose facial image has a degree of similarity less than the threshold, the name of such participant is not displayed. In such case, "Guest" is displayed instead of the name of the participant.

In the second embodiment, the verification process described above according to the first embodiment is applied to a videoconference system, such that the distributed data processing terminal 8 is able to display a name of the participant at another site with an image of the participant. Accordingly, the participant who is participating in the video conference can easily recognize the participant at a remote site.

In one or more of the above-described embodiments, the image acquisition terminal 2 acquires captured image data, but the present invention is not limited thereto. For example, the image acquisition terminal 2 may acquire audio data by collecting audio in the example case of the second embodiment, or even temperature data from a temperature sensor, or humidity data from a humidity sensor. In such case, the image acquisition terminal 2 may be simply referred to as the "acquisition terminal".

Further, any one of the CPUs 301, 501, and 701, etc. may be a single processor or a multiple processor. Similarly, any one of the image acquisition terminal 2, the distributed data processing terminal 6, and the centralized data processing server 7 may be implemented by one or more apparatus such as one or more computers. The distributed data processing terminal 6 may also operate as a server.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Further, the object to be detected may not only be limited to a facial image. Any other part of the human body that can help to identify an individual, such as human eyes, may be detected as an object to be used for verification.

The present invention can be implemented in any convenient form, for example using dedicated hardware, or a mixture of dedicated hardware and software. The present invention may be implemented as computer software implemented by one or more networked processing apparatuses. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium (carrier means). The carrier medium can compromise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid state memory device.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on chip (SOC), graphics processing unit (GPU), and conventional circuit components arranged to perform the recited functions.

This patent application is based on and claims priority pursuant to 35 U.S.C. § 119(a) to Japanese Patent Application No. 2017-148437, filed on Jul. 31, 2017, and 2018-136067, filed on Jul. 19, 2018, in the Japan Patent Office, the entire disclosure of which is hereby incorporated by reference herein.

REFERENCE SIGNS LIST

2 Image acquisition terminal (an example of acquisition terminal)
3 Real-time data processing terminal
5 Terminal data processing terminal
6 Distributed data processing terminal
7 Centralized data processing server
34 Image processor
35 Object detector
38 Connection unit
51 Transmitter and receiver (example of first transmitter)
61 Transmitter and receiver (example of second transmitter, example of receiver)
62 Acceptance unit
67 Display control
69 Storing and reading unit
71 Transmitter and receiver (example of third transmitter)
74 Feature value generator
75 Verification unit
200 Intranet
600 Internet
3001 Element number management DB
6000 Storage unit
6001 Verification data management DB
7001 Feature value management DB

The invention claimed is:

1. A communication system comprising:
an image acquisition terminal configured to obtain a captured image, the captured image including at least one object that is captured with an imaging device;
a distributed data processing terminal configured to display the captured image and register verification data; and
a centralized data processing server connected with the distributed data processing terminal through a network,
the image acquisition terminal including,
first processing circuitry configured to
detect the at least one object in the captured image to generate a partial image that is a part of the captured image having the detected at least one object, and
transmit the partial image to the distributed data processing terminal as data to be verified,
the distributed data processing terminal including,
a second processing circuitry configured to transmit the data to be verified that is received from the image acquisition terminal, and the verification data that is registered to the centralized data processing server, the verification data being an image representing a specific object,
the centralized data processing server including,
a third processing circuitry configured to
verify the data to be verified, using the verification data that is received from the distributed data processing terminal, to generate a verification result, and
transmit the verification result to the distributed data processing terminal, to cause the distributed data processing terminal to display information based on the verification result with the captured image.

2. The communication system of claim 1, wherein the first processing circuitry of the image acquisition terminal includes:
a first processor on a real-time data processing terminal, being configured to perform real-time processing to sequentially capture images in real-time using the imaging device; and
a second processor on a terminal data processing device connected with the real-time data processing terminal, and being configured to transmit the partial image to the distributed data processing terminal.

3. The communication system of claim 2, wherein the first processor on the real-time data processing terminal and the second processor on the terminal data processing device are configured to operate under operating systems that are independent from each other.

4. The communication system of claim 2,
wherein the first processor executes an image recognition application installed on the real-time data processing terminal to perform real-time processing, and
wherein the second processor executes communication application installed on the terminal data processing device to transmit the partial image.

5. The communication system of claim 2, wherein the real-time data processing terminal further includes:
a memory that stores, for each of a plurality of types of imaging device, information indicating a type of imaging device, and a number of imaging elements included in the imaging device having a specific type, the information indicating the type of imaging device stored in association with the number of imaging elements included in the imaging device having a specific type; and
a connector configured to connect to any one of the plurality of types of imaging device, and when connected to the imaging device having the specific type, configured to obtain the captured image that is captured with the imaging device and information on the specific type of the imaging device,
wherein the first processor is configured to specify a number of the imaging elements included in the imaging device having the specific type, which is stored in the memory in association with the information indicating the specific type of the imaging device that is obtained, and to perform image processing on the captured image obtained from the imaging device according to the specified number of imaging elements in the imaging device.

6. The communication system of claim 1, wherein the distributed data processing terminal includes:
a memory that stores, for each one of a plurality of images each representing the specific object as the verification data, a name of an image file that contains the image of the specific object, and a name representing the specific object of the image, the name of the image file stored in association with the name representing the specific object of the image,
wherein the second processing circuitry is configured to receive, for each one of the plurality of images as the verification data, the verification result from the third processing circuitry of the centralized data processing server, the verification result indicating similarity between the partial image as the data to be verified, and the image of the specific object as the verification data;

store, for each one of the plurality of images as the verification data, the verification result indicating similarity in association with the name of the specific object of the image; and control a display to display the name of the specific object of the image that is associated with a largest value of similarity of the verification result.

7. The communication system of claim 6, wherein the second processing circuitry of the distributed data processing terminal is further configured to accept a selection of the image file that contains the image representing the specific object as the verification data, and an input of the name representing the specific object.

8. The communication system of claim 1,
wherein the second processing circuitry of the distributed data processing terminal is further configured to transmit a uniform resource locator (URL) of the data to be verified, and a URL of the verification data, to the centralized data processing server, and in response to reception of a request for accessing the URL of the data to be verified and the URL of the verification data, the second processing circuitry of the distributed data processing terminal transmits the data to be verified and the verification data to the centralized data processing server.

9. The communication system of claim 1,
wherein the image acquisition terminal starts processing to detect the at least one object in the captured image, in response to reception of a request for starting processing to detect the at least one object from the distributed data processing terminal.

10. The communication system of claim 1, wherein the third processing circuitry of the centralized data processing server is configured to generate a first feature value parameter of the specific object in the image, from the verification data that is received from the distributed data processing terminal; and wherein the centralized data processing sever further includes:

a memory that stores the first feature value parameter in association with a name representing the specific object of the image, wherein, in response to reception of the partial image as the data to be verified from the distributed data processing terminal, the third processing circuitry is configured to
generate a second feature value parameter of the detected at least one object from the partial image as the data to be verified, and compare between the first feature value parameter and the second feature value parameter to generate the verification result indicating similarity between the partial image and the image of the specific object.

11. The communication system of claim 1, wherein the second processing circuitry of the distributed data processing terminal is configured to:

determine that the detected at least one object is unknown, based on the verification result indicating similarity between the partial image as the data to be verified, and the image of the specific object as the verification data; and control a display to display, as the information based on the verification result, a notification indicating that the detected at least one object in the captured image is unknown.

12. The communication system of claim 11, wherein the second processing circuitry is further configured to transmit information on a number of determinations determining that the detected at least one object is unknown, to the centralized data processing server.

13. The communication system of claim 1,
wherein the image acquisition terminal and the distributed data processing terminal together operate as a distributed processing system, and a plurality of distributed processing systems is disposed at different sites each communicably connected with the centralized data processing server.

14. The communication system of claim 13, wherein the plurality of distributed processing systems includes a first distributed processing system and a second distributed processing system that communicate with each other, wherein the distributed data processing terminal of the first distributed processing system displays the captured image that is captured with the image acquisition terminal of the second distributed processing system, with information based on the verification result of the captured image that is captured with the image acquisition terminal of the second distributed processing system.

15. The communication system of claim 1, wherein the detected at least one object includes a part of a human body used for identifying an individual.

16. A distributed processing system comprising:
processing circuitry configured to
obtain a captured image including at least one object that is captured with an imaging device;

detect the at least one object in the captured image to generate a partial image that is a part of the captured image having the detected at least one object;

transmit the partial image as data to be verified, and verification data that is registered, to a centralized data processing server through a network, the verification data being an image representing a specific object;

receive a verification result of verifying the transmitted data to be verified based on comparing the at least one object and the specific object of the verification data that is registered, from the centralized data processing server; and control a display to display information based on the verification result, with the captured image.

17. A distributed processing method, performed by an image acquisition terminal and a distributed data processing terminal that operate in cooperation, the method comprising:

obtaining, via the image acquisition terminal, a captured image, the captured image including at least one object that is captured with an imaging device;

detecting, via the image acquisition terminal, the at least one object in the captured image to generate a partial image that is a part of the captured image having the at least one object detected;

transmitting, via the image acquisition terminal, the partial image to the distributed data processing terminal as data to be verified;

transmitting, via the distributed data processing terminal, the data to be verified that is received from the image acquisition terminal, and verification data registered, to a centralized data processing server, the verification data being an image representing a specific object;

receiving, via the distributed data processing terminal, a verification result of verifying the transmitted data to be verified based on comparing the at least one object and the specific object of the verification data that is registered, from the centralized data processing server; and displaying, via the distributed data processing terminal, information based on the verification result, with the captured image.

18. The communication system of claim 3, wherein the first processor executes image recognition application installed on the real-time data processing terminal to perform real-time processing, and
wherein the second processor executes communication application installed on the terminal data processing device to transmit the partial image.

19. The communication system of claim 3, wherein the real-time data processing terminal further includes:
a memory that stores, for each of a plurality of types of imaging device, information indicating a type of imaging device, and a number of imaging elements included in the imaging device having a specific type, the number of imaging elements is stored in association with information indicating the type of imaging device; and
a connector configured to connect to any one of the plurality of types of imaging device, and when connected to the imaging device having the specific type, to obtain the captured image that is captured with the imaging device and information on the specific type of the imaging device, and
wherein the first processor is configured to specify a number of the imaging elements included in the imaging device having the specific type, which is stored in the memory in association with the information indicating the specific type of the imaging device that is obtained, and to perform image processing on the captured image obtained from the imaging device according to the specified number of imaging elements in the imaging device.

20. The distributed processing system of claim 16, comprising:
an image acquisition terminal configured to obtain the captured image; and
a distributed data processing terminal communicably connected to the centralized data processing server through the network,
wherein the processing circuitry includes first processing circuitry that resides on the image acquisition terminal, and second processing circuitry that resides on the distributed data processing terminal,
the first processing circuitry being configured to detect the at least one object in the captured image to generate the partial image, and transmit the partial image to the distributed data processing terminal as data to be verified, and
the second processing circuitry being configured to transmit the data to be verified that is received from the image acquisition terminal and the verification data that is registered to the centralized data processing server, receive the verification result of verifying the data to be verified from the centralized data processing server, and control the display to display information based on the verification result.

* * * * *